(12) United States Patent
Schantz et al.

(10) Patent No.: US 8,253,626 B2
(45) Date of Patent: Aug. 28, 2012

(54) MULTIPLE PHASE STATE NEAR-FIELD ELECTROMAGNETIC SYSTEM AND METHOD FOR COMMUNICATION AND LOCATION

(75) Inventors: Hans Gregory Schantz, Huntsville, AL (US); Andrew Compston, Stanford, CA (US); Robert DePierre, Huntsville, AL (US); James Matthew Barron, Huntsville, AL (US)

(73) Assignee: Q-Track Corporation, Huntsville, AL (US)

( * ) Notice: Subject to any disclaimer, the term of this patent is extended or adjusted under 35 U.S.C. 154(b) by 580 days.

(21) Appl. No.: 12/391,209

(22) Filed: Feb. 23, 2009

(65) Prior Publication Data

US 2009/0280742 A1    Nov. 12, 2009

Related U.S. Application Data

(60) Provisional application No. 61/067,002, filed on Feb. 25, 2008.

(51) Int. Cl.
*G01S 3/02* (2006.01)
*G01S 5/04* (2006.01)
*H04B 5/00* (2006.01)

(52) U.S. Cl. ........ 342/450; 342/442; 342/463; 455/41.1

(58) Field of Classification Search .................. 342/442, 342/445, 450, 457, 463; 455/41.1, 42, 45; 375/295, 298, 302
See application file for complete search history.

(56) References Cited

U.S. PATENT DOCUMENTS

2004/0032363 A1 * 2/2004 Schantz et al. ............... 342/127
* cited by examiner

*Primary Examiner* — Dao Phan
(74) *Attorney, Agent, or Firm* — James Richards

(57) ABSTRACT

A multiple phase state near-field electromagnetic location and communication system includes a multiple phase state near-field transmitter, and a near-field locator receiver. The near-field transmitter is capable of operation in at least two states and each of these at least two states generates a state characteristic difference detected at the near-field locator receiver. The state characteristic difference may be employed for location determination, communication or both. The present invention is particularly well-suited for use in conjunction with a near-field electromagnetic ranging system. In further embodiments, a multiple phase state near-field electromagnetic location and communication process includes the steps of determining a transmission state for a near-field quadrature transmitter, transmitting a near-field transmission corresponding to said transmission state, receiving a near-field transmission corresponding to said transmission state, and determining a difference between at least two properties of said near-field transmission where the difference is characteristic of and corresponding to the transmission state.

20 Claims, 23 Drawing Sheets

MULTIPLE PHASE STATE NEAR-FIELD ELECTROMAGNETIC SYSTEM AND METHOD FOR COMMUNICATION AND LOCATION

This application claims the benefit under 35 U.S.C. 119(e) of U.S. Provisional Application 61/067,002, titled "State variable near-field electromagnetic system and method for communication and location," filed Feb. 25, 2008 by Schantz et al.

RELATED APPLICATIONS AND GOVERNMENT RIGHTS

The U.S. Government has a paid up license in this invention and the right in limited circumstances to require the patent owner to license others on reasonable terms as provided for by the terms of Grant 1R43OH008952-01A1 awarded by NIOSH and US Army Contract W15P7T-07-C-M007.

FIELD OF THE INVENTION

The present invention relates generally to near-field electromagnetic systems, particularly for use in measurement of position or location by means of electromagnetic signaling, as well as for communication.

BACKGROUND

Conventional wireless systems have difficulty operating in complicated, cluttered, environments. This is because their high frequency links suffer from "multipath." Multipath is multiple propagation of signals along many paths. Multipath tends to scramble data communications and confound location systems. Multipath limits the utility of wireless systems in dangerous environments where robust data links and reliable location information are most essential.

Workers in potentially hazardous environments like nuclear and chemical plants, coal mines, industrial facilities, or in emergency response or military operations might require real time location awareness. Any number of industrial accidents have been made far worse because rescuers were unable to locate injured workers, delaying rescue and risking the rescuers' own safety by prolonged searching. A reliable data link could enable low data rate communication of workers' vital signs or environmental sensor data.

By operating at low frequencies with long wavelengths, near-field wireless systems avoid the problem of multipath. A wireless link operating within a typical maximum range of around one-half wavelength. Near-field wireless systems have demonstrated a remarkable ability to provide accurate location data even in complicated industrial environments.

As accurate as near-field wireless systems are, there is always need for additional accuracy.

There is a further need for a wireless system that can provide robust voice and data communications in complicated wireless propagation environments.

There are many applications for range and position information. Tracking assets, people, animals and objects generally. Commercial businesses have a need to track customers, employees, merchandise equipment. Warehouse operations need to track merchandise, equipment, and employees. Theme parks need to track customers, equipment, and employees. The military, during training exercises, needs to track soldiers, equipment. Each of these applications often involves indoor or urban canyon environments were GPS is unavailable or operates poorly or has insufficient accuracy to pinpoint an object location to a particular room, shelf or bin. These tracked objects often have a need for data transmission, such as a temperature or shock sensor or other device associated with the device or for other data transmission.

Near field systems appear to offer good resistance to multipath and may be operated indoors independent of GPS. Near field systems are challenged by FCC power restrictions and an ever increasing need for greater accuracy and range as more potential applications are envisioned for the systems.

In view of the foregoing, there is a need for electromagnetic ranging systems capable of tracking people, assets, and objects generally in complex multipath environments, such as indoor environments, industrial and warehouse environments, and other environments where GPS and related techniques are unusable. There is a further need to convey modulated data in association with the ranging system without adding substantial complexity and cost to the system.

BRIEF SUMMARY OF THE INVENTION

A state variable near-field electromagnetic location and communication system includes a multiple state near-field transmitter, and a near-field locator receiver. In one embodiment, the multiple state transmitter drives two orthogonal H-field antennas with quadrature signals to generate a spiral phase state for one state of the multiple states. One of the quadrature signals may be shifted 180 degrees to reverse the direction of the spiral phase state for a second state. The near field locator receiver includes E-field and H-field receivers. The system receives and compares the signals from the two transmission states to determine location information. The two states can provide range and azimuth information and/or may be used to encode information. Additional methods are disclosed for generating a rotating field. A third mutually orthogonal magnetic or electric antenna may be added to the transmitter for more states. In one embodiment, where the transmitter orientation may be variable, an orientation sensor, e.g. an accelerometer, may be used to sense the vertical direction and adjust the drive signals to the H-field antennas to maintain a correct sense vertical rotation axis of the transmitted signal in spite of tilt or upside-down orientation of the transmitter.

In further embodiments, a state variable near-field electromagnetic location and communication process includes the steps of transmitting a spiral phase H-field signal sequence comprising at least two signal states; determining a difference between at least two properties of the received signal from each signal state; and comparing the differences determined for each signal state to determine position information or to decode data from the transmission.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

DETAILED DESCRIPTION OF THE PREFERRED EMBODIMENTS

Overview of the Invention

Figure 1A:
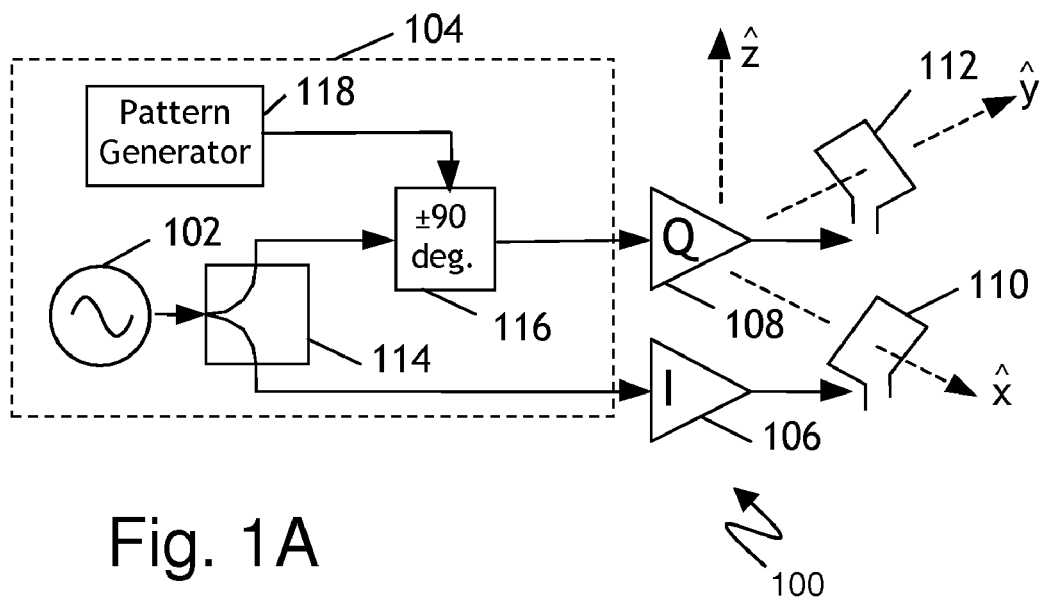
FIG. 1A is an exemplary block diagram showing a first near-field quadrature transmitter.

The present invention is directed to a multiple phase state near-field electromagnetic system and method of communication and location. The system is based on establishing a plurality of near-field phase states in the vicinity of the transmitter. In a preferred embodiment, a rotating pattern yields a spiral phase state near field signal, which may be generated by feeding two orthogonal H-field antennas with two respective signals 90 degrees out of phase. A unique property of the resulting transmitted signal is that the phase relationship between the E-field and H-field, as a function of distance and orientation from the antennas, generates a spiral pattern of equal phase solutions indicative of distance and direction. The spiral pattern quickly becomes asymptotic with distance and is not noticeable in the far field signals. These spiral patterns are described in greater detail later with reference to FIG. 6A-6F. When the direction of pattern rotation is reversed by flipping the phase of one of the signals by 180 degrees, the spiral solution is spatially oriented in the opposite direction. Thus, position information may be found by measuring the signals received and comparing with the expected spiral pattern. In addition, phase shift keyed voice and data communication may be modulated on the resulting signals.

In particular, one embodiment finds a position without requiring precision synchronization by transmitting and receiving signals from the two opposite rotation states and finding a position that satisfies both conditions simultaneously. That is, an E-field to H-field phase measurement from one rotation direction will give a position solution locus having a spiral shape rotating in one direction. Upon reversing the transmission phase rotation direction, the resulting received E-field to H-field phase will yield a position solution locus rotating in the opposite direction. An overlay of the plots from both directions will equivalently solve the simultaneous equations for a single point position solution.

Although the preferred embodiment of the multiple phase state near-field system and method for location and communication herein disclosed assumes mobile transmitters and a fixed infrastructure of locator-receivers, nothing herein should be interpreted to preclude implementing an "inverse architecture" system wherein a mobile locator receive might position itself relative to an infrastructure of transmitter beacons, as disclosed in Applicant's U.S. Pat. No. 6,963,301, which is incorporated herein by reference.

Near Field Basics

Near field electromagnetic ranging was first fully described in applicant's "System and method for near-field electromagnetic ranging" (Ser. No. 10/355,612; filed Jan. 31, 2003, now U.S. Pat. No. 6,963,301, issued Nov. 8, 2005), which is incorporated herein by reference in its entirety.

Near-field quadrature transmitters were first fully described in applicant's "Near field location system and method," (Ser. No. 11/272,533; filed Nov. 10, 2005, now U.S. Pat. No. 7,307,595 issued Dec. 11, 2007), which is incorporated herein by reference in its entirety. Additional antenna systems suited for use with near-field quadrature transmitters are presented in applicant's co-pending "Space efficient magnetic antenna system" (Ser. No. 11/473,595; filed Jun. 22, 2006; published as Pub. No. 2006/0244673), which is incorporated herein by reference in its entirety.

Methods for calibrating near-field electromagnetic ranging systems were first fully described in Applicant's "Near field electromagnetic positioning system and method," (Ser. No. 10/958,165; filed Oct. 4, 2004, now U.S. Pat. No. 7,298,314 issued Nov. 20, 2007), which is incorporated herein by reference in its entirety. Additional aspects of near-field electromagnetic location system calibration are disclosed in applicant's "Near field electromagnetic positioning system and method," (Ser. No. 11/986,319; filed Nov. 19, 2007, published as Pub. No. US 2008-0165050 A1), which is incorporated herein by reference in its entirety. Display technologies for use with near-field electromagnetic ranging systems are disclosed in applicant's co-pending "Electromagnetic location and display system and method," (Ser. No. 11/500,660; filed Aug. 8, 2006; published as Pub. No. 2006/0267833), which is incorporated herein by reference in its entirety.

Application of near-field electromagnetic ranging techniques to localizing cargo containers and incorporating sensors in tracking tags are the subjects of applicant's "Low frequency asset tag tracking system and method" (Ser. No. 11/215,699; filed Aug. 30, 2005, now U.S. Pat. No. 7,414,571 issued Aug. 19, 2008), which is incorporated herein by reference in its entirety. Applications to simulated dosimetry are the subject of applicant's co-pending "System and method for simulated dosimetry using a RTLS" (Ser. No. 11/897,100; filed Aug. 29, 2007; published as Pub. No. 2008/0241805), which is incorporated herein by reference in its entirety. Further applications to supply chain management and asset localization are presented in applicant's "Asset localization, identification, and movement system and method" (Ser. No. 11/890,350; filed Aug. 6, 2007; published as Pub. No. 2007/0282482), which is incorporated herein by reference in its entirety. All of the above listed US Patent documents are hereby incorporated herein by reference in their entirety.

One principal advantage of near-field electromagnetic ranging and associated technology is that near field properties allow for accurate and simple location in complicated propagation environments. By using long wavelength, low frequency signals, near-field electromagnetic ranging avoids the problem of multipath that plagues high frequency indoor tracking systems. One family of near-field electromagnetic ranging systems typically operates in an unsynchronized fashion, sending out a fixed signal to be localized. These fixed signals have only a finite number of attributes that can be detected and employed in a tracking algorithm. By employing the multiple states of the present invention, near field systems can benefit from information available from the more complex signal. In a multi-link architecture, multiple position solutions may be combined to improve accuracy and reliability and increase coverage.

The preferred embodiments will now be discussed in detail with reference to the drawings.

Near Field Quadrature Transmitter

FIG. 1A is an exemplary block diagram showing a first near-field quadrature transmitter 100. The present invention is well suited for the transmission of sensor data on a low frequency transmitter signal, as disclosed in applicant's "Low frequency asset tag tracking system and method," application Ser. No. 11/215,699, filed Aug. 30, 2005, now U.S. Pat. No. 7,414,571, which is herein incorporated by reference.

The near-field quadrature transmitter 100 comprises a means 104 for generating in-phase (I) and quadrature (Q) signals, a first (I) amplifier 106, a second (Q) amplifier 108, a first (I) magnetic antenna 110, and a second (Q) magnetic antenna 112. The means 104 for generating in-phase (I) and quadrature (Q) signals may comprise a combination of an oscillator 102, a signal divider 114 and a quadrature shifter 116. The quadrature shifter 116 is preferentially capable of imparting either a +90 deg or −90 deg shift (i.e., a 270 deg. shift). The quadrature shifter is driven by a pattern generator 118 that switches the phase shift between the +90 and −90 degree states. The pattern delivered by the pattern generator may be a square wave or may represent a more complex pattern or coded pattern as will be described in more detail later.

In an alternate embodiment, the quadrature shifter may be applied to channel I.

The first (I) magnetic antenna 110 is generally aligned with a first normal axis $\hat{x}$. The second (Q) magnetic antenna 112 is generally aligned with a second normal axis 9. The first normal axis $\hat{x}$ preferably lies substantially orthogonal to the second normal axis $\hat{y}$. The first (I) magnetic antenna 110 and the second (Q) magnetic antenna 112 cooperate with the means 104 for generating in-phase (I) and quadrature (Q) signals to create an antenna pattern that is vertically polarized and omni-directional in the $\hat{x}$–$\hat{y}$ plane.

The system is typically configured so that the $\hat{x}$–$\hat{y}$ plane lies generally co-planar to an area, such as a warehouse floor, where a tag carrying the transmitter 100 may be tracked.

Figure 1B:
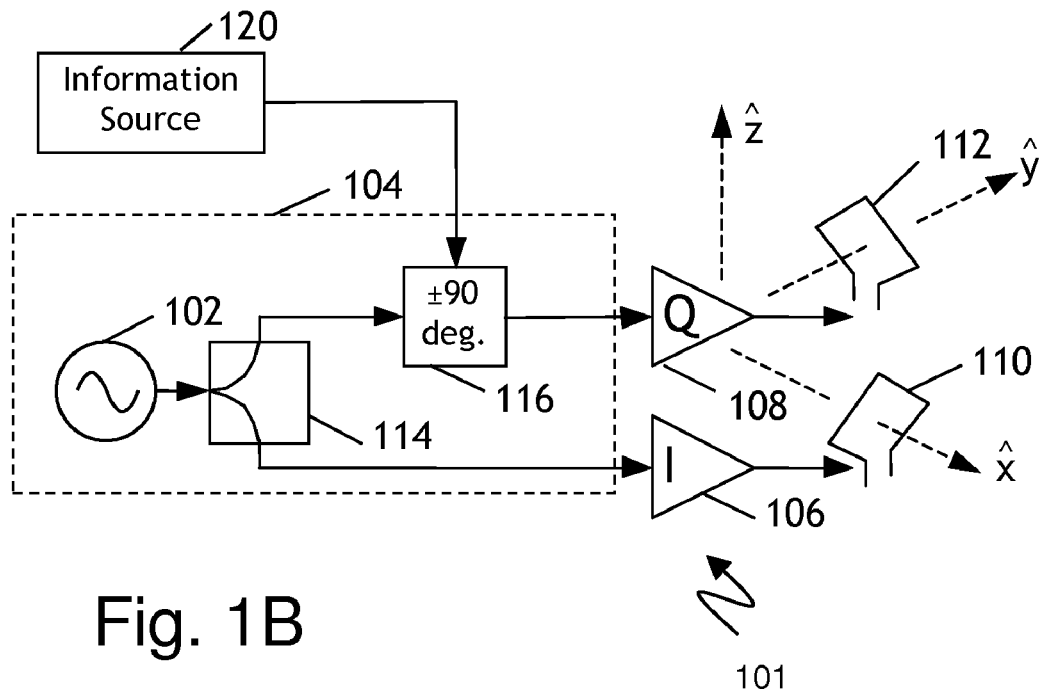
FIG. 1B is an exemplary block diagram showing the near-field quadrature transmitter of FIG. 1A adapted for communications.

FIG. 1B is an exemplary block diagram showing the near-field quadrature transmitter of FIG. 1A adapted for communications. The phase shifter 116 of FIG. 1B is driven by an external information source 120. As shown the information source 120 is a digital source that selects either +90 or −90 degrees phase shift. The information may also be digitally encoded for data whitening, encryption or error correction. Alternatively, the information source 120 may provide an analog signal for driving an analog phase shifter 116. In one embodiment, the quadrature transmitter 100 may include the pattern generator 118 and connection to the information source 120 and may alternate between providing positioning information as shown in FIG. 1A and providing data as in FIG. 1B. In alternate embodiments, the same received data bits can be used for both position and tracking. Thus, the system can locate and communicate simultaneously. The information source 120 may select either a +90 or −90 deg phase shift in response to data input from one or more sensors (not shown) co-located with quadrature transmitter 100.

Figure 2A:
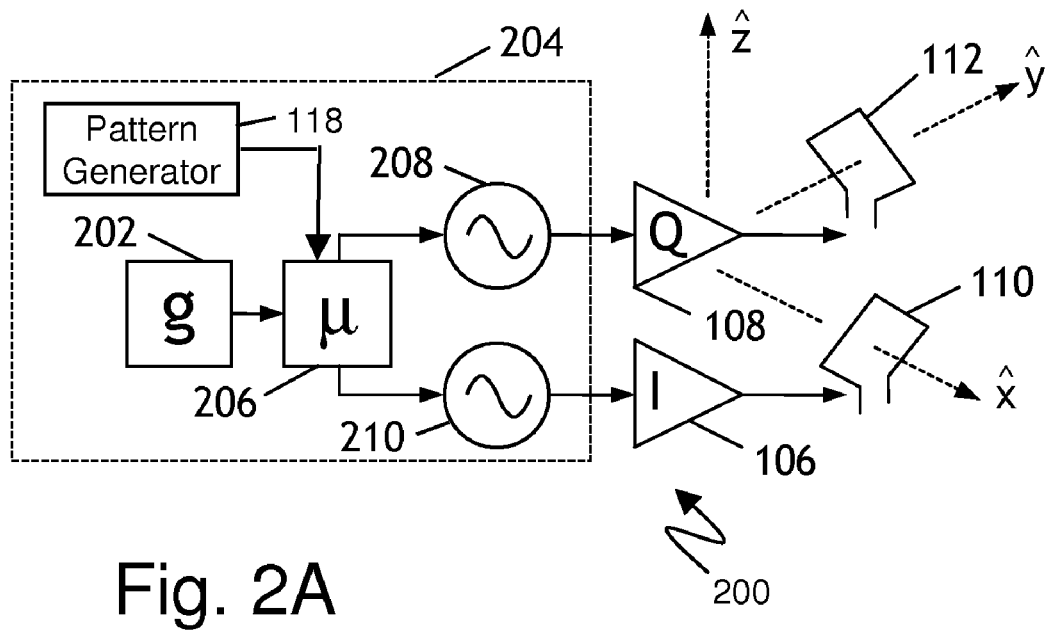
FIG. 2A is an exemplary block diagram showing a second near-field quadrature transmitter.

FIG. 2A is an exemplary block diagram showing a second near-field quadrature transmitter 200. The second near field transmitter 200 includes a processor 206 and digital synthesizer for generating the quadrature signals, and also includes an orientation sensor 202 to sense the vertical orientation of the transmitter 200 as may be needed in a typical location tag system or other system where the transmitter has an uncontrolled or unknown orientation. The orientation information may be used to correct orientation aspects; in particular, upside down orientation may be corrected by reversing the phase rotation direction of the transmitted signal. A preferred orientation sensor 202 may include an accelerometer. Alternative orientation sensors include level sensors, which may be based on a pendulum or liquid, magnetic sensors, such as a magnetic compass, or other sensors as are known in the art for sensing orientation.

The first alternate generator 204 comprises a microprocessor 206, an accelerometer 202, a first (I) oscillator 210, and a second (Q) oscillator 208. The first (I) oscillator 210, and the second (Q) oscillator 208 are preferentially direct digital synthesizers (DDS) capable of generating signals of desired frequency and phase as directed by the microprocessor 206. The accelerometer 202 is preferentially capable of determining orientation of the second near-field quadrature transmitter 200. The pattern generator 118 is shown driving the microprocessor 206 for clarity of explanation; however, the pattern generator 118 may be implemented as a procedure in the microprocessor 206.

In typical operation, the microprocessor 206 can cause the first (I) oscillator 210, and the second (Q) oscillator 208 to generate in-phase and quadrature signals, respectively. Feeding an in-phase signal to the first (I) magnetic antenna 110 and a ninety degrees delayed quadrature signal to the second (Q) magnetic antenna 112 results in an antenna pattern that is vertically polarized and omni-directional in the $\hat{x}$–$\hat{y}$ plane.

Figure 2B:
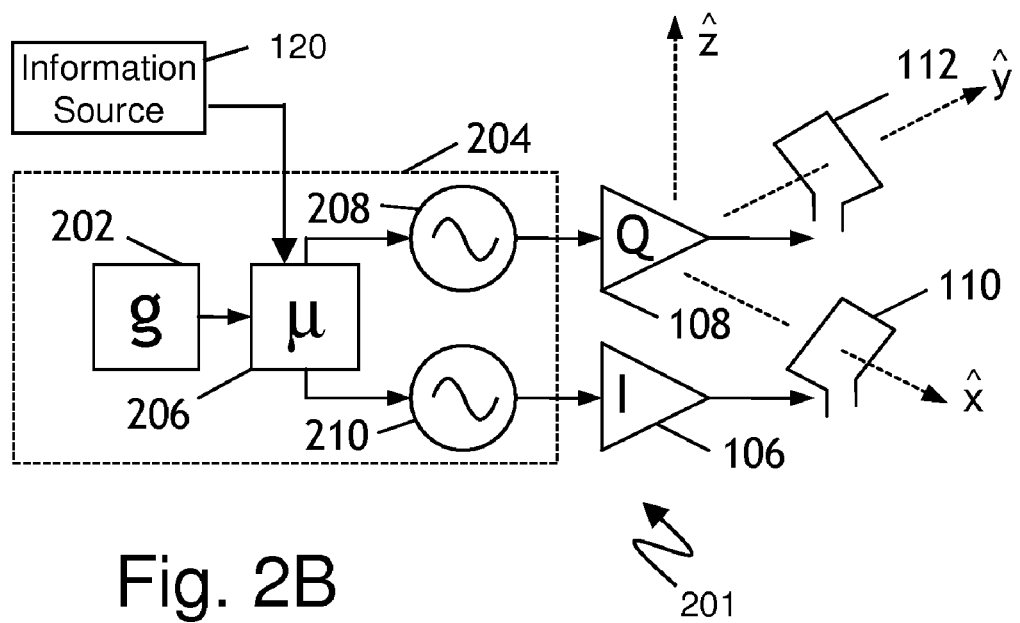
FIG. 2B is an exemplary block diagram showing the second near-field quadrature transmitter of FIG. 2A adapted for communication.

FIG. 2B is an exemplary block diagram showing the second near-field quadrature transmitter of FIG. 2A adapted for communication. The transmitter 201 of FIG. 2B is similar to the transmitter 200 of FIG. 2A except that the phase shift control is coupled to an information source 120 rather than the pattern generator 118. Thus, the information may control the pattern rotation direction and phase state caused by transmitter 201. The information may be recovered by demodulating the signal as will be described in detail later in this disclosure.

Figure 2C:
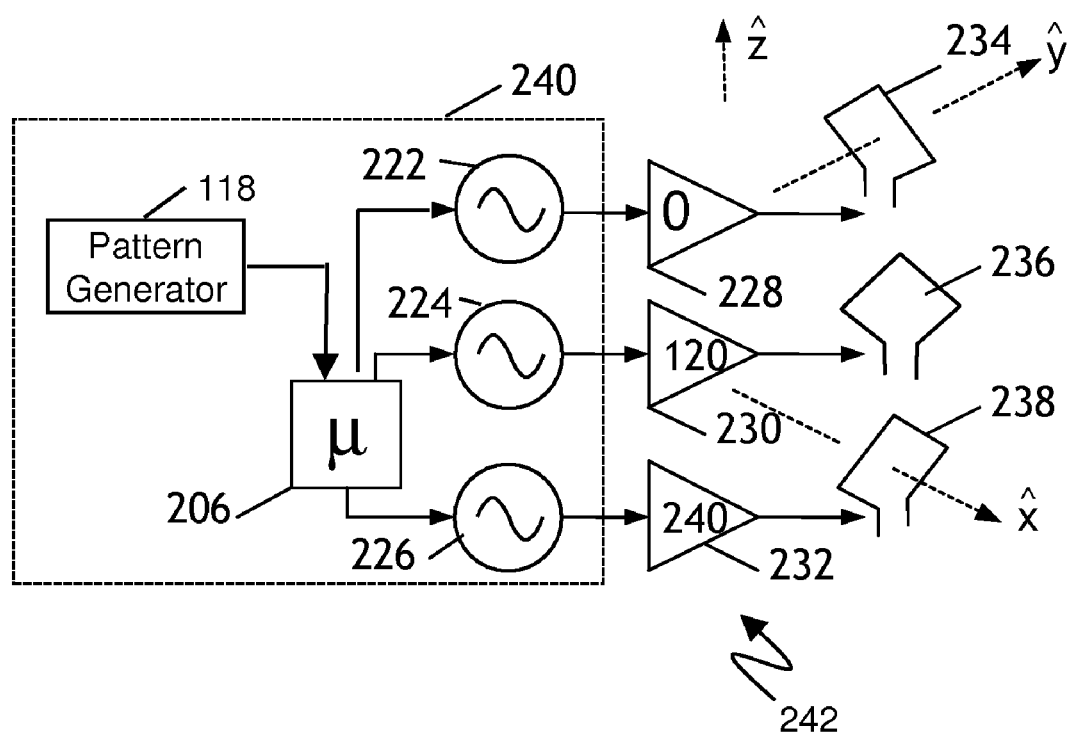
FIG. 2C is an exemplary block diagram showing a transmitter 242 with a third alternative generator 240 for generating a spatially spiral phase H-field signal.

FIG. 2C is an exemplary block diagram showing a transmitter 242 with a third alternative generator 240 for generating a rotating pattern H-field signal. FIG. 2C shows three phase generators comprising a processor 206 and three DDS oscillators 222, 224, and 226 generating signals at 0, 120, and 240 degrees phase shift. The oscillators drive three amplifiers 228, 230, and 232, which drive three antennas 234, 236, and 238 with axes at 0, 120, and 240 degrees orientation, respectively, in the $\hat{x}$–$\hat{y}$ plane. The phase is controlled in response to the pattern generator 118 or the information source 120 (not shown). The direction of signal spatial rotation may be reversed by reversing the phase feed, i.e., 0, −120, and −240 degrees. In a similar manner, any number of phases may be used to generate near-field phase state.

Figure 2D:
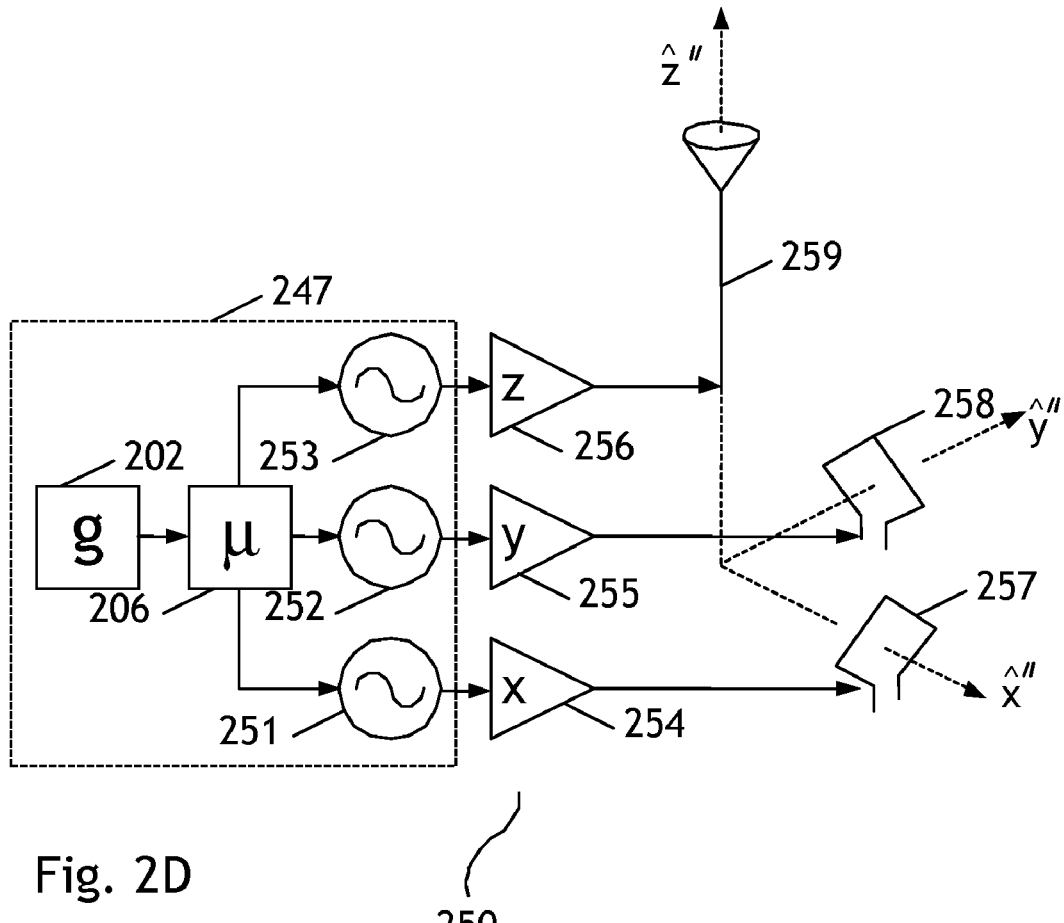
FIG. 2D is an exemplary block diagram showing a fourth exemplary near-field transmitter 250 suitable for communication or location or both.

FIG. 2D is an exemplary block diagram showing a fourth exemplary near-field transmitter 250 suitable for communication or location or both. Fourth exemplary near-field transmitter 250 includes fourth generator 247. Fourth generator 247 includes first (x) oscillator 251, second (y) oscillator 252, and third (z) oscillator 253. The oscillators 251, 252, and 253 drive three amplifiers 254, 255, 256, which drive three mutually orthogonal antennas 257, 258, and 259. Microprocessor 206 controls oscillators 251, 252, and 253 in response to pattern generator 118 or the information source 120 (not shown). First (x) antenna 257 and second (y) antenna 258 are magnetic antennas, and third (z) antenna 259 is an electric antenna. Fourth exemplary near-field transmitter 250 is capable of generating a variety of useful phase states. Although the phase of any particular field components will progress 360 degrees during each period or cycle of an RF excitation, the inventors have discovered that there exist certain stable phase relationships in the near-field of a transmitter. These phase relationships are well suited for obtaining the location of a near-field transmitter with respect to a receiver, or the location of a receiver with respect to a near-field transmitter. In addition, the phase state generated by near-field transmitters (like near-field transmitter 250) may be independent of the orientation of the near-field transmitter in the azimuthal x-y plane. A "phase state" is a particular spatial pattern of phase relationships about a receiver due to the presence of a transmitter. Phase states will be defined in greater detail in FIGS. 6A-F and FIGS. 7-15.

For instance, the electric and magnetic field components are ninety degrees out of phase with each other close to a near-field transmitter and converge to be in phase with each other by about one third to one-half of a wavelength away. This phase relation can be exploited to yield range or, more generally, location data. Applicant's U.S. Pat. No. 6,963,301 first disclosed a system and method for exploiting this and other near-field phase and amplitude relationships to obtain location information. The present invention discloses a system and method for exploiting multiple phase states for purpose of either location, communication, or both. Fourth exemplary near-field transmitter 250 is capable of producing a wide variety of phase states, a few of which will now be described.

In a first phase state, microprocessor 206 disables third (z) oscillator 253 and third (z) amplifier 256 so that third antenna 259 does not contribute to the near-field phase state. Microprocessor 206 causes first (x) oscillator 251 and second (y) oscillator 252 to operate in quadrature with first (x) oscillator 251 leading second (y) oscillator 252 by a phase angle substantially equal to ninety degrees.

In a second phase state, microprocessor 206 disables third (z) oscillator 253 and third (z) amplifier 256 so that third antenna 259 does not contribute to the near-field phase state. Microprocessor 206 causes first (x) oscillator 251 and second (y) oscillator 252 to operate in quadrature with first (x) oscillator 251 lagging second (y) oscillator 252 by a phase angle substantially equal to ninety degrees.

In a third phase state, microprocessor 206 disables first (x) oscillator 251 and second (y) oscillator 252 so that first (x) antenna 257 and second (y) antenna 258 do not contribute to the near-field phase state. Microprocessor 206 causes third (z) oscillator 253 and third (z) amplifier 256 to drive third antenna 259. This third phase state is essentially similar to that disclosed in detail in applicant's U.S. Pat. No. 6,963,301.

In a fourth phase state, microprocessor 206 enables third (z) oscillator 253 and third (z) amplifier 256 so that third antenna 259 does contribute to the near-field phase state. Microprocessor 206 causes first (x) oscillator 251 and second (y) oscillator 252 to operate in quadrature with first (x) oscillator 251 leading second (y) oscillator 252 by a phase angle substantially equal to ninety degrees.

In a fifth phase state, microprocessor 206 enables third (z) oscillator 253 and third (z) amplifier 256 so that third antenna 259 does contribute to the near-field phase state. Microprocessor 206 causes first (x) oscillator 251 and second (y) oscillator 252 to operate in quadrature with first (x) oscillator 251 lagging second (y) oscillator 252 by a phase angle substantially equal to ninety degrees.

These five phase states address a few possible combinations of electric and magnetic dipole moments to generate phase patterns that might be useful for location and communication. These exemplary phase states were chosen to illustrate principally vertical polarization signals. This is because vertical polarization signals tend to experience superior propagation relative to horizontal polarization signals. In still further alternate embodiments, magnetic antennas 257 and 258 might be replaced by electric antennas, for instance, to generate substantially horizontally polarized signals. Additional phase states will be presented elsewhere in the present disclosure.

Furthermore, these five phase states are not all necessary to the successful operation of applicant's multi-state near-field electromagnetic system and method of communication and location. For simplicity, a subset of these phase states might be employed. In fact in a preferred embodiment, only a first phase state and a second phase state are employed.

Figure 2E:
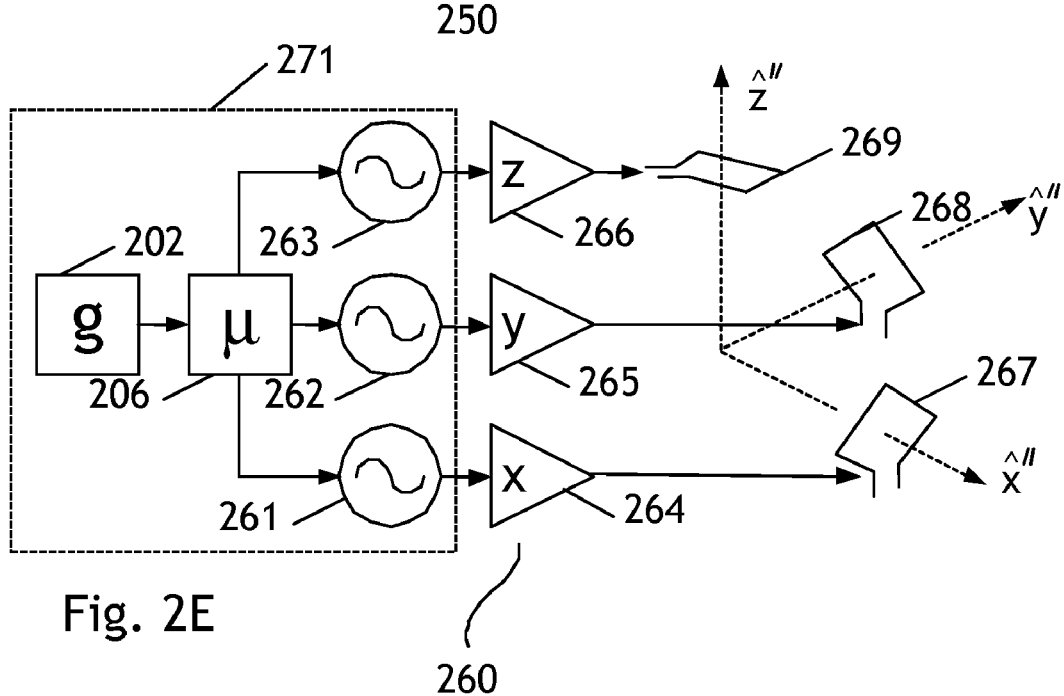
FIG. 2E is an exemplary block diagram showing a fifth near-field transmitter 260 suitable for communication or location or both.

FIG. 2E is an exemplary block diagram showing a fifth near-field transmitter 260 suitable for communication or location or both. Fifth alternate near-field transmitter 260 includes a second alternate generator 271 which provides means for generating in-phase (I) and quadrature (Q) signals 210,208. The second alternate generator 271 includes the accelerometer 202, the microprocessor 206, a first (x axis) oscillator 261, a second (y axis) oscillator 262, and a third (z axis) oscillator 263. Fifth alternate near-field transmitter 260 further includes a first power amplifier 261 and a first (x) magnetic antenna 267, a second power amplifier 265 and a second (y) magnetic antenna 268, and a third power amplifier 266 and a third (z) magnetic antenna 269, the normals of each magnetic antenna being generally aligned with their respective coordinate axes. In a preferred embodiment, second alternate generator 271 yields in-phase (I) and quadrature (Q) signals. In alternate embodiments, second alternate generator 271 might produce different signal configurations.

The accelerometer 202 can determine orientation of the fifth alternate near-field transmitter 260 and enable the microprocessor 206 to select not only which two of the three oscillators to drive, but also appropriate phasing relations to generate an appropriate first state or second state response even if axes $\hat{x}$, $\hat{y}$, and $\hat{z}$ have been rotated to an arbitrary orientation with respect to axes $\hat{x}'$, $\hat{y}'$, and $\hat{z}'$.

An additional sixth phase state is possible if the microprocessor uses orientation data available from the accelerometer to excite the antenna whose normal lies closest to vertical. This horizontal polarization state will tend not to propagate as well as the two vertically polarized states; yet will have unique phase characteristics suitable for tracking.

In one embodiment with $\hat{x}$ and $\hat{y}$ oriented H-field antennas, an accelerometer may be placed to sense the orientation of the $\hat{z}$ axis with respect to the $\hat{z}'$ axis. (Alternatively a tilt sensor, such as a pendulum or liquid level based sensor, having only up-down sensing may be used.) When the ẑ axis acceleration is positive, i.e., zero to one g acceleration, the antennas are excited as normal, i.e., state 1 is +90° phase shift and state 2 is −90° phase shift. When the ẑ axis acceleration is negative, i.e., zero to minus one g acceleration, the antennas are excited in reverse, i.e., state 1 is −90° phase shift and state 2 is +90° phase shift. Thus, when the device is turned upside down, the rotation reverses in direction in body sense direction to maintain the same direction in earth sense direction.

The concept can be refined by adding a third mutually orthogonal H-field antenna as in FIG. 2E and using a variable amplitude and phase drive to each antenna to maintain a correct rotation direction about a vertical ẑ' earth sense axis. For this level correction system, a three axis vertical sensor is desired.

Figure 3A:
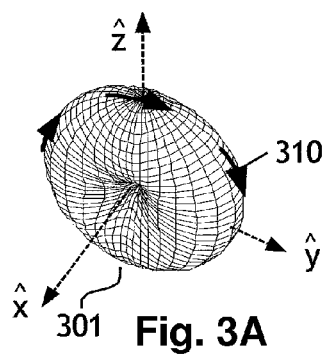
FIG. 3A-FIG. 3I show various instantaneous antenna patterns and associated phase states.

FIG. 3A shows a first instantaneous antenna pattern 301 from a near-field transmitter. Arrow 306 denotes the electric field orientation or polarization. First instantaneous antenna pattern 301 is characteristic of a magnetic antenna whose normal is aligned with the x̂ axis, like first antenna 257 of FIG. 2D.

Figure 3B:
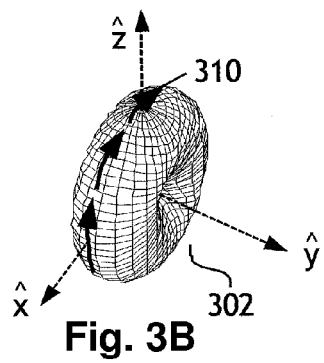

FIG. 3B shows a second instantaneous antenna pattern 302 from a near-field transmitter. Second instantaneous antenna pattern 302 is characteristic of a magnetic antenna whose normal is aligned with the ŷ axis, like second antenna 258 of FIG. 2D.

Figure 3C:
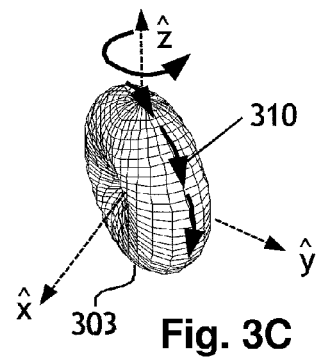

FIG. 3C shows a third instantaneous antenna pattern 303 from a near-field transmitter. Third instantaneous antenna pattern 303 rotates in a right-handed or counter-clockwise sense about axis ẑ. Third instantaneous antenna pattern 303 is characteristic of a first phase state in which a first magnetic antenna whose normal is aligned with the x̂ axis (like first antenna 257 of FIG. 2D) and a second magnetic antenna whose normal is aligned with the ŷ axis (like second antenna 258 of FIG. 2D) are driven in quadrature with the signal applied to first antenna 257 leading the quadrature signal (+Q) applied to second antenna 258. The I signal applied to the first (x) magnetic antenna 257 might have time dependence proportional sin ωt and the +Q signal applied to the second (y) magnetic antenna 258 might have a time dependence proportional to cos ωt where ω=2πf is the angular frequency and f is a characteristic RF frequency.

Figure 3D:
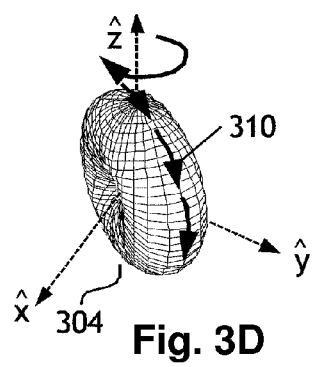

FIG. 3D shows a fourth instantaneous antenna pattern 304 from a near-field transmitter. Fourth instantaneous antenna pattern 304 rotates in a left-handed or clockwise sense about axis ẑ. Fourth instantaneous antenna pattern 304 is characteristic of a second phase state in which a first magnetic antenna whose normal is aligned with the x̂ axis (like first antenna 257 of FIG. 2D) and a second magnetic antenna whose normal is aligned with the ŷ axis (like second antenna 258 of FIG. 2D) are driven in quadrature with the in-phase signal (I) applied to first antenna 257 lagging the quadrature signal (−Q) applied to second antenna 258. The −Q signal applied to the second (y) magnetic antenna 258 might have a time dependence proportional to −cos ωt.

Figure 3E:
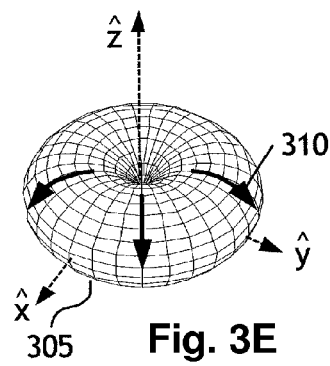

FIG. 3E shows a fifth instantaneous antenna pattern 305 from a near-field transmitter. Fifth instantaneous antenna pattern 305 is characteristic an electric antenna generally aligned with the ẑ axis (like third antenna 259 of FIG. 2D). Antenna pattern 305 is characteristic of a third phase state.

Figure 3F:
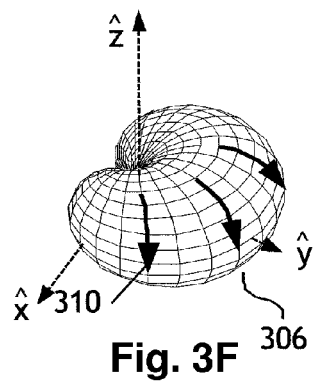

FIG. 3F shows a sixth instantaneous antenna pattern 306 from a near-field transmitter. Sixth instantaneous antenna pattern 306 is a "cardioid pattern," characteristic of a superposition of a fifth instantaneous antenna pattern 305 of FIG. 3e and a first instantaneous antenna pattern 301 of FIG. 3a. If an electric antenna whose normal is generally aligned with the ẑ axis (like third antenna 259 of FIG. 2D) and a magnetic antenna whose normal is generally aligned with the x̂ axis (like first antenna 257 of FIG. 2D) are both excited so as to have an in-phase response and appropriate amplitudes, the result is the cardioid pattern 306.

Figure 3G:
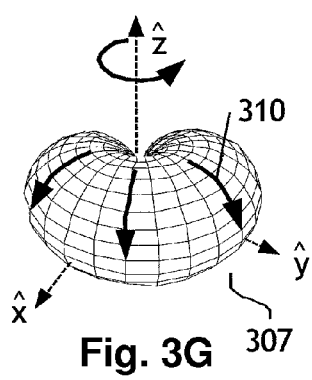

FIG. 3G shows a seventh instantaneous antenna pattern 307 from a near-field transmitter. Seventh instantaneous antenna pattern 307 rotates in a right-handed or counter-clockwise sense about axis ẑ. Seventh instantaneous antenna pattern 307 is characteristic of a fourth phase state in which a first magnetic antenna whose normal is generally aligned with the x̂ axis (like first antenna 257 of FIG. 2D), and a second magnetic antenna whose normal is generally aligned with the ŷ axis (like second antenna 258 of FIG. 2D) are driven in quadrature with the signal applied to first antenna 257 leading the quadrature signal (+Q) applied to second antenna 258. At the same time, a third electric antenna whose normal is generally aligned with the ẑ axis (like third antenna 258 of FIG. 2D) generates a signal at the same frequency.

Figure 3H:
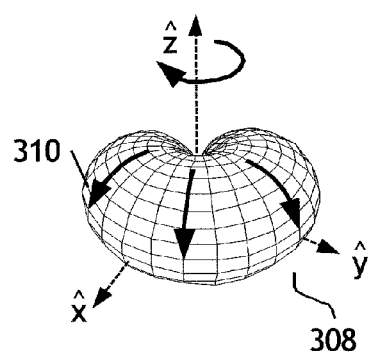

FIG. 3H shows an eighth instantaneous antenna pattern 308 from a near-field transmitter. Eighth instantaneous antenna pattern 308 rotates in a left-handed or clockwise sense about axis ẑ. Eighth instantaneous antenna pattern 308 is characteristic of a fifth phase state in which a first magnetic antenna whose normal is generally aligned with the x̂ axis (like first antenna 257 of FIG. 2D), and a second magnetic antenna whose normal is generally aligned with the ŷ axis (like second antenna 258 of FIG. 2D) are driven in quadrature with the signal applied to first antenna 257 lagging the quadrature signal (−Q) applied to second antenna 258. At the same time, a third electric antenna whose normal is generally aligned with the ẑ axis (like third antenna 258 of FIG. 2D) generates a signal at the same frequency.

Figure 3I:
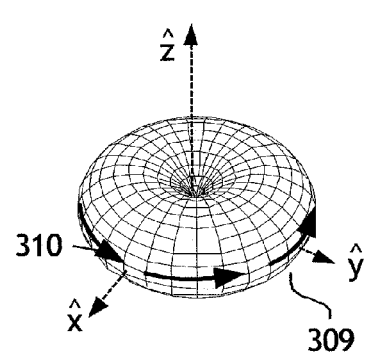

FIG. 3I shows a ninth instantaneous antenna pattern 309 from a near-field transmitter. Ninth instantaneous antenna pattern 309 is characteristic of a magnetic antenna whose normal is generally aligned with the ẑ axis (like third antenna 259 of FIG. 2D). Antenna pattern 305 is characteristic of a sixth phase state.

For ease of explanation, the patterns shown in FIG. 3A-3I are effective far-field patterns and do not reflect all of the subtleties of the near-field behavior. For instance, there will be radial field components normally neglected in considering far-field behavior. It should therefore be understood that the patterns of FIG. 3A-3I are presented for purpose of illustration of the various phase states and are not intended to be a full depiction of relevant near-field behavior, which will be described for a subset of these phase states later in this disclosure.

The inventors have discovered that the phase relationships generated by near-field quadrature transmitters (such as near-field quadrature transmitter 100) depend on which channel is delayed ninety degrees with respect to the other. In both the first state and the second state, the resulting antenna pattern remains vertically polarized and omni-directional in the x̂-ŷ plane, however certain signal phase relationships discernable at a remote receiver will change as a function of distance and direction from the receiver and transmitted phase rotation direction state.

A transition from the first state to the second state or vice versa may be caused by alternating the sense of the I and Q signals. Equivalently, the I signal may be fixed in phase and a binary phase shift keying (BPSK) modulation may be applied to the Q signal alternating between the first state and the second state by alternating between a phase offset of ±90 degrees. A transition between the first state and the second state will also result if a near-field quadrature transmitter (such as second near-field quadrature transmitter 200) is inverted or turned upside down. The accelerometer 202 can determine this inverted orientation and enable the microprocessor to generate quadrature signals appropriate for the orientation of a near-field quadrature transmitter (such as second near-field quadrature transmitter 200).

Clever choice of modulation schemes can enable a remote receiver to discern which of two states the near-field quadrature transmitter is sending regardless of orientation. For instance, in a particular transmission period, the near-field quadrature transmitter might transmit in a first state for one-eighth of the transmission period, in the second state for one-quarter of the transmission period, in the first state for three-eighths of the transmission period, and in the second state for one-eighth of the transmission period. A remote receiver can examine the timing of the 1-2-3-2 pattern and distinguish the first state (with unequal periods of transmission) from the second state (with equal periods of transmission) even if reception is unsynchronized and the receiver begins reception of the sequence at an arbitrary point in time.

The choice of axes and architecture of several examples in this disclosure relates to the typical application of ranging in a single plane, such as a single floor building or warehouse or outside space on the ground. Thus, a primary interest is 2D positioning and transmitter coordinate axes $\hat{x}$, $\hat{y}$ lie in the horizontal plane with respect to the ground and transmitter coordinate axis $\hat{z}$ is substantially co-parallel to the vertical earth axis. The invention, however, may be adapted to 3D positioning by using 2D positioning in two orthogonal planes. 2D positioning in non-horizontal planes may be accomplished by rotation of the axes and antennas to conform to the non-horizontal plane.

Figure 4A:
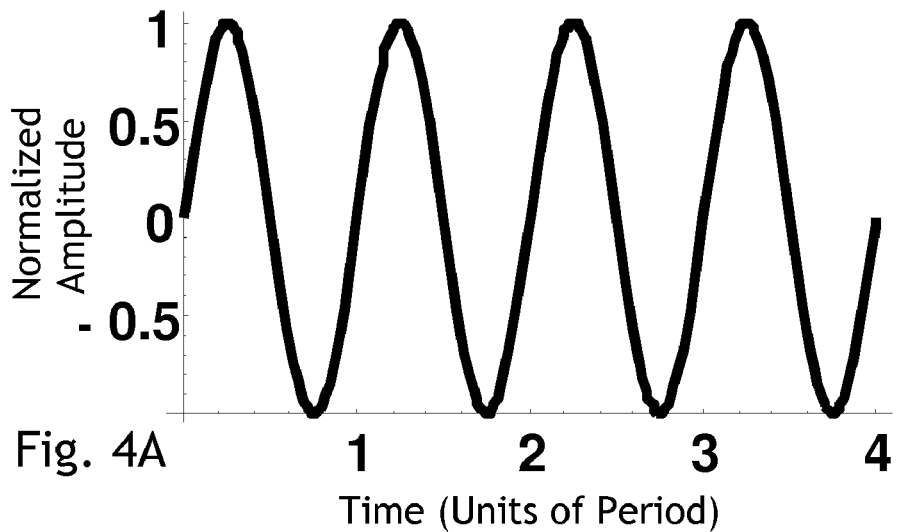
FIG. 4A-FIG. 4C show relative phase for I, +Q, and –Q signals.

FIG. 4A shows a representative in-phase signal (I). The I signal might have time dependence proportional sin ωt where ω=2πf is the angular frequency and f is a characteristic RF frequency. The horizontal axis of FIG. 4A is time in units of periods and the vertical axis denotes normalized amplitude.

Figure 4B:
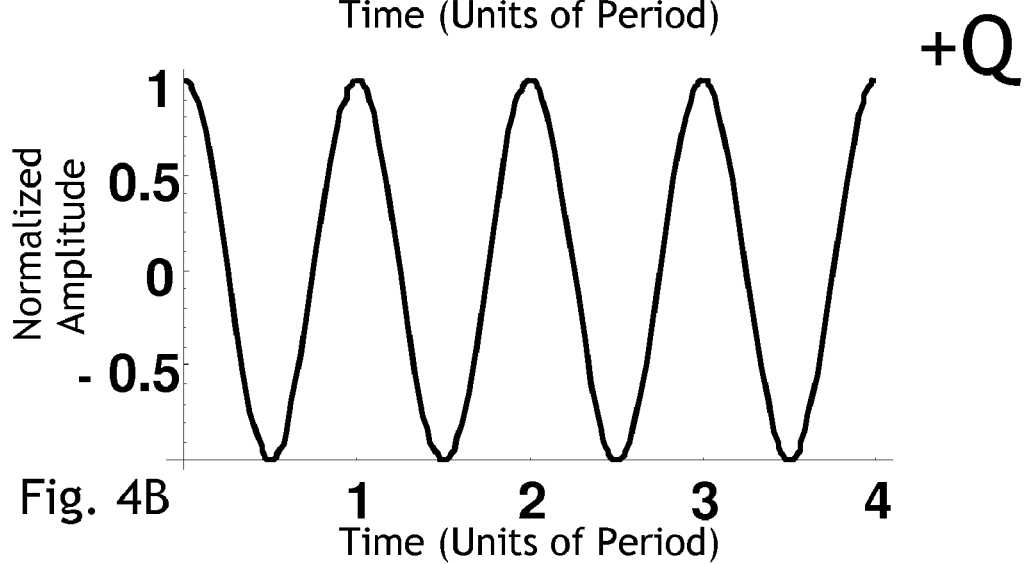

FIG. 4B shows a representative quadrature signal (+Q). The +Q signal leads the in-phase signal. The +Q signal thus might have a time dependence proportional to cos ωt. The horizontal axis of FIG. 4B is time in units of periods and the vertical axis denotes normalized amplitude.

Figure 4C:
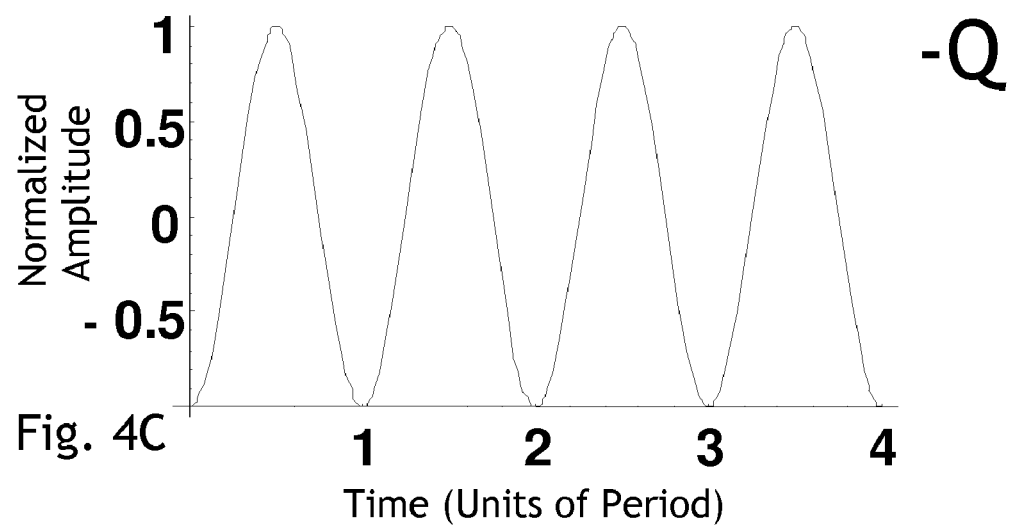

FIG. 4C shows a representative quadrature signal (−Q). The −Q signal lags the in-phase signal. The −Q signal thus might have a time dependence proportional to −cos ωt. The horizontal axis of FIG. 4C is time in units of periods and the vertical axis denotes normalized amplitude.

Near-Field Locator Receiver

Figure 5:
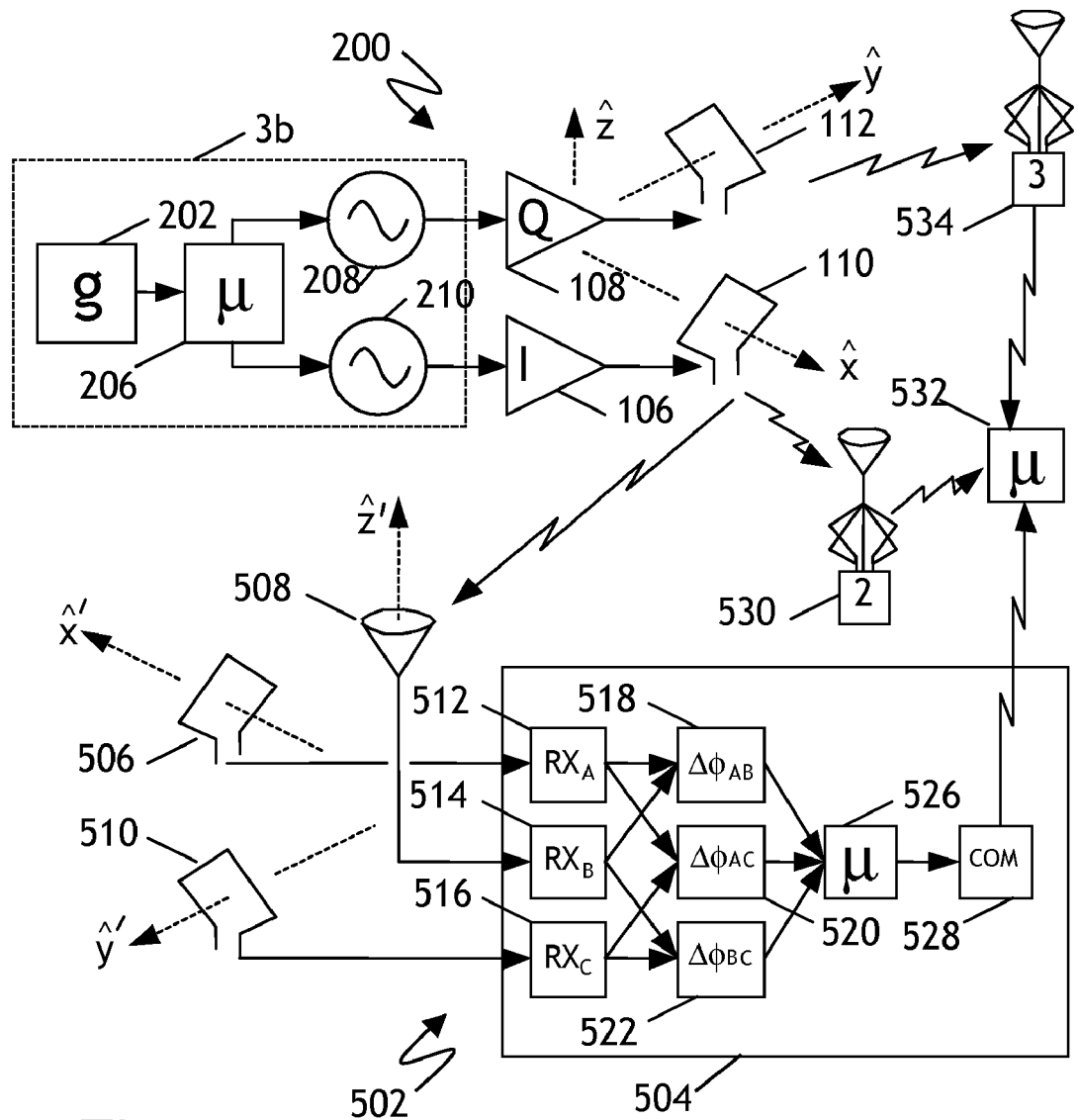
FIG. 5 is an exemplary block diagram showing the details of a near-field locator receiver within the context of a multiple locator location system.

FIG. 5 is an exemplary block diagram of a preferred embodiment showing the details of a near-field locator receiver within the context of a multiple locator location system. The locator system shows a transmitter 200 to be located and three locator receivers 502, 530 and 534 in communication with a central processor 532 for combining information from all of the locators 502, 530 and 534. The first near-field locator receiver 502 is shown in detail. The receiver 502 comprises a first magnetic (A antenna) receive antenna 506, an electric (B antenna) receive antenna 508, a second magnetic (C antenna) receive antenna 510, a first (A) receiver 512, a second (B) receiver 514, a third (C) receiver 516, a first (AB) phase comparator 518, a second (AC) phase comparator 520, a third (BC) phase comparator 522, a microprocessor 526, and a communications interface 528.

The normal axis of first (A) magnetic receive antenna 506 is generally aligned with a first receive normal axis $\hat{x}'$. The normal axis of second (C) magnetic receive antenna 510 is generally aligned with a second receive normal axis $\hat{y}'$. The first receive normal axis $\hat{x}'$ preferably lies substantially orthogonal to the second receive normal axis $\hat{y}'$. The electric (B) receive antenna 508 is generally oriented along the vertical receive axis $\hat{z}'$. The vertical receive axis $\hat{z}'$ preferably lies generally orthogonal to both the first receive normal axis $\hat{x}'$ and the second receive normal axis $\hat{y}'$. The first (A) receiver 512 receives a first magnetic field signal from the first (A) magnetic receive antenna 506. The second (B) receiver 514 receives electric field signals from the electric (B) receive antenna 508. The third (C) receiver 516 receives a second magnetic field signal from the second (C) magnetic receive antenna 510.

The preferred embodiment of FIG. 5 shows the axes mutually perpendicular; however, other angles may be accommodated, if accounted for. For example, the magnetic antennas 506 and 510 may be at a 60 degree angle instead of a 90 degree angle. The position solution then takes into account the actual angle of the antennas. Thus any angle having a significant or substantial normal component would work to a degree. Typically, the angle should be at least 30 degrees, better 45 degrees or 60 degrees with 90 degrees preferred. As the angle deviates from 90 degrees there is typically a loss of accuracy and coverage. In the extreme, only a single H-field antenna may be used. Similarly, the electric field antenna should be typically at least 30 degrees, better at least 45 or 60 degrees, preferably 90 degrees from each of the magnetic antennas.

The first (AB) phase comparator 518 compares the first magnetic field signal from the first (A) receiver 512 to the electric field signal from the second (B) receiver 514 to determine the AB phase difference. The second (AC) phase comparator 520 compares the first magnetic field signal from the first (A) receiver 512 to the second magnetic field signal from the third (C) receiver 516 to determine the AC phase difference. The third (BC) phase comparator 522 compares the electric field signal from the second (B) receiver 514 to the second magnetic field signal from the third (C) receiver 516 to determine the BC phase difference. The first (AB) phase comparator 518, the second (AC) phase comparator 520, and the third (BC) phase comparator 522 relay respective phase differences to the microprocessor 526. The microprocessor 526 records respective phase differences and can distinguish between different phase difference states as will be further explained later. In alternate embodiments, the microprocessor 526 can incorporate the function of the phase comparators by precise timing of signals from the first (A) receiver 512, the second (B) receiver 514, and the third (C) receiver 516. The microprocessor 526 can relay results to a central microprocessor 532 intermediate a communications interface 528. The communications interface 528 may be a wireless (i.e. ZigBee, WiFi, or other wireless link) or a direct (i.e. Ethernet, serial, USB, or other direct link) interface.

The central microprocessor 532 receives data from the first near-field locator receiver 502, and other near-field locator receivers such as second near-field locator receiver 530, and third near-field locator receiver 534. The central microprocessor 532 can then determine the location of the near-field quadrature transmitter 200 using the principles of near-field electromagnetic ranging as disclosed herein.

Coordinate axes $\hat{x}$, $\hat{y}$, and $\hat{z}$ associated with the near-field quadrature transmitter 200 are often not co-parallel with coordinate axes $\hat{x}'$, $\hat{y}'$, and $\hat{z}'$ associated with near-field locator receiver 502. In a preferred embodiment, the plane containing transmitter axes $\hat{x}$ and $\hat{y}$ should be approximately co-planar with the plane containing receiver axes $\hat{x}'$ and $\hat{y}'$. Equivalently, in a preferred embodiment transmitter vertical axis $\hat{z}$ should be substantially co-parallel to receiver vertical axis $\hat{z}'$. If near-field quadrature transmitter 200 is at an arbitrary orientation with respect to coordinate axes $\hat{x}'$, $\hat{y}'$, and $\hat{z}'$, then the orientation sensor 202 can determine orientation and compensate to create an effective near-field pattern roughly equivalent to what would be expected if axes $\hat{z}$ and $\hat{z}'$ were substantially co-parallel and the plane containing axes $\hat{x}$ and $\hat{y}$ were approximately co-planar with the plane containing axes $\hat{x}'$ and $\hat{y}'$.

Phase Relations of Near-Field Quadrature Transmitters

FIG. 6A-FIG. 6F present plots of various phase difference contours as a function of transmitter position as would be received by the near-field locator receiver 502 in a preferred embodiment. These phase difference contours describe the phase state. A "phase state" is a particular spatial pattern of phase relationships about a receiver 502 due to the presence of a transmitter 200. The near-field locator receiver 502 lies at the origin of the phase plot, and the phase contours describe the magnitude of the phase differences that would be detected by the receiver 502 at the origin due to the presence of the transmitter 200 at the corresponding location in the plane.

The plots of FIGS. 6A-6F are shown on one page for better comparison of one set with another. The plots are shown singly in FIGS. 7-15 for greater detail and for showing the phase angles for each plot.

The equations for FIGS. 6A-6F and FIGS. 7-15 are derived as follows. Assume the x-aligned magnetic antenna 110 has a time dependence proportional to sin ωt. Further assume the y-aligned magnetic antenna 112 has a time dependence proportional to cos ωt. The E-fields associated with the x-aligned magnetic antenna 110 will be:

$$E_x = -\frac{m_0 \omega^3}{4\pi\varepsilon_0 c^4} \left( \frac{\cos(\omega t - kr)}{k^2 r^2} - \frac{\sin(\omega t - kr)}{kr} \right) (\sin\phi\hat{\theta} + \cos\theta\cos\phi\hat{\phi})$$

equation (1)

and $$H_x = \frac{m_0}{4\pi r^2} \left( \frac{\sin(\omega t - kr)}{r} + \frac{\omega\cos(\omega t - kr)}{c} \right) (2\sin\theta\cos\phi\hat{r} - \cos\theta\cos\phi\hat{\theta} + \sin\phi\hat{\phi}) + \frac{m_0 \omega^2 \sin(\omega t - kr)}{4\pi c^2 r}(\cos\theta\cos\phi\hat{\theta} - \sin\phi\hat{\phi})$$

equation (2)

where $m_0$ is the magnetic dipole moment, $k=2\pi/\lambda$ is the wave number, c is the speed of light, and r, θ, and φ are the usual spherical coordinates in a right-handed coordinate system with φ measured from the $+\hat{x}$ axis. The E-fields associated with the y-aligned magnetic antenna 112 will be:

$$E_y = \frac{m_0}{4\pi\varepsilon_0 c^2 r}$$

equation (3)

$$\left( -\frac{\omega\sin(\omega t - kr)}{r} - \frac{\omega^2 \cos(\omega t - kr)}{c} \right)(\cos\phi\hat{\theta} - \cos\theta\sin\phi\hat{\phi})$$

and $$H_y = \frac{m_0}{4\pi r^2} \left( \frac{\cos(\omega t - kr)}{r} - \frac{\omega\sin(\omega t - kr)}{c} \right) (2\sin\theta\sin\phi\hat{r} - \cos\theta\sin\phi\hat{\theta} - \cos\phi\hat{\phi}) + \frac{m_0 \omega^2 \cos(\omega t - kr)}{4\pi c^2 r}(\cos\theta\sin\phi\hat{\theta} + \cos\phi\hat{\phi})$$

equation (4)

Assume axes $\hat{z}$ and $\hat{z}'$ are co-parallel and suppose the near-field quadrature transmitter 200 lies at polar coordinates (r, α) in the plane containing axes $\hat{x}'$ and $\hat{y}'$ Then, the phase differences will be given by:

$$\Delta\phi_{AB} = \cot^{-1}[k^3 r^3 + 2(1+k^2 r^2)\tan\alpha]$$

equation (5)

and $$\Delta\phi_{BC} = \cot^{-1}[k^3 r^3 - 2(1+k^2 r^2)\cot\alpha]$$

equation (6)

Figure 6A:
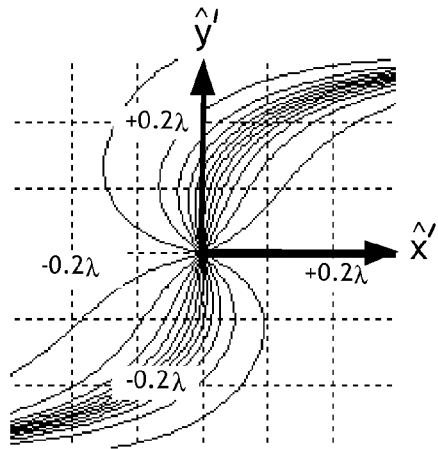
FIG. 6A-FIG. 6F present plots of various phase difference contours as a function of transmitter position as would be received by the near-field locator receiver.

FIG. 6A presents a plot of phase difference contours for $\Delta\phi_{BC}$ as a function of the location of near-field quadrature transmitter 200 in the plane containing axes $\hat{x}'$ and $\hat{y}'$ around near-field locator receiver 502 when near-field quadrature transmitter 200 is in the first state. $\Delta\phi_{BC}$ is the difference between the phase of the electric field signal and the second magnetic field signal. The phase delta relations of Eq. (5) and Eq. (6) potentially result in certain ambiguities because the arc-cotangent function is only defined for a domain of π radians or 180 degrees. Plotting all these relations requires attention be paid to the branch cuts so as to extend these relations through the entire 2π radians or 360 degrees. The inventors have found that comparison to measured data or to the results of method-of-moment simulations of these scenarios is useful for resolving the ambiguity.

Figure 6B:
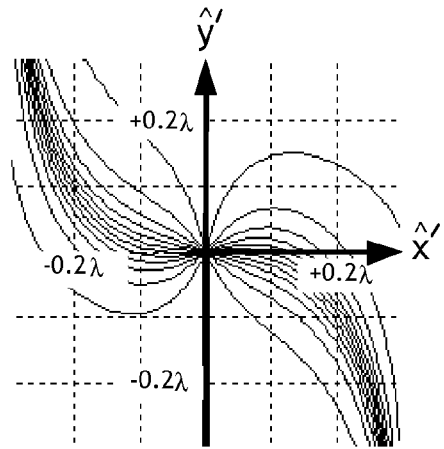

FIG. 6B presents a plot of phase difference contours for $\Delta\phi_{AB}$ as a function of the location of near-field quadrature transmitter 200 in the plane containing axes $\hat{x}'$ and $\hat{y}'$ around near-field locator receiver 502 when near-field quadrature transmitter 200 is in the first state. $\Delta\phi_{AB}$ is the difference between the phase of the first magnetic field signal and the electric field signal. FIGS. 6A and 6B are characteristic of the first phase state.

Figure 6C:
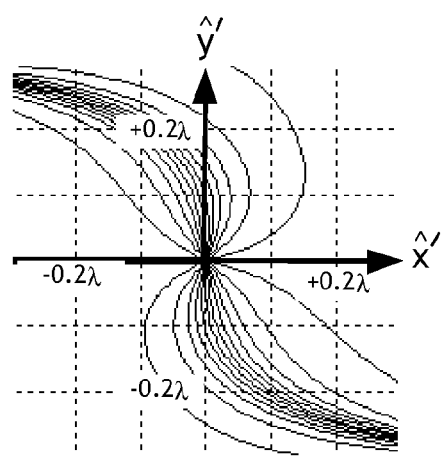

FIG. 6C presents a plot of phase difference contours for $\Delta\phi_{BC}$ as a function of the location of near-field quadrature transmitter 200 in the plane containing axes $\hat{x}'$ and $\hat{y}'$ around near-field locator receiver 502 when near-field quadrature transmitter 200 is in the second state. $\Delta\phi_{BC}$ is the difference between the phase of the electric field signal and the second magnetic field signal.

Figure 6D:
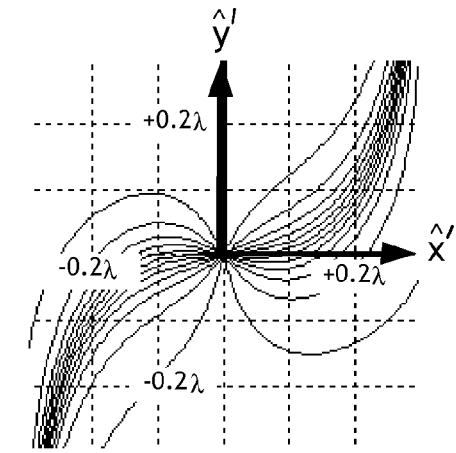

FIG. 6D presents a plot of phase difference contours for $\Delta\phi_{AB}$ as a function of the location of near-field quadrature transmitter 200 in the plane containing axes $\hat{x}'$ and $\hat{y}'$ around near-field locator receiver 502 when near-field quadrature transmitter 200 is in the second state. Note that the sense of the spiral spatial dependence of phase difference detected at near-field locator receiver 502 changes between the first state and the second state. $\Delta\phi_{AB}$ is the difference between the phase of the first magnetic signal and the electric field signal. FIGS. 6C and 6D are characteristic of the second phase state.

Figure 6E:
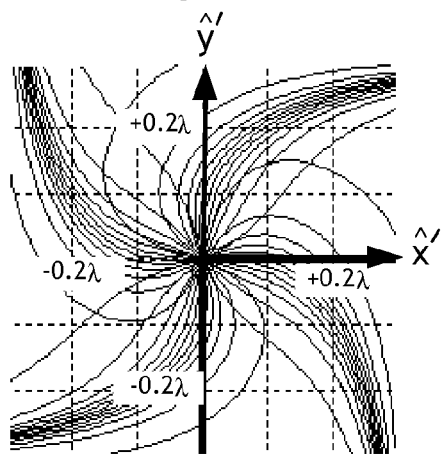

FIG. 6E superimposes FIG. 6A and FIG. 6B. The resulting phase contour lines for the first state enable highly accurate direction finding for a near-field quadrature transmitter 200 within about λ/2π of near-field locator receiver 502, and less accurate direction finding for ranges greater than about λ/2π. The contour lines may provide useful information out to λ/2 or λ.

Figure 6F:
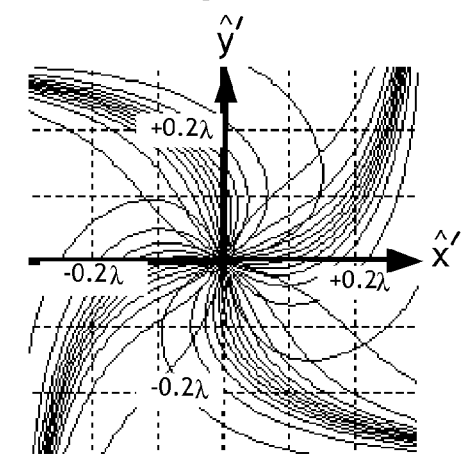
Figure 7:
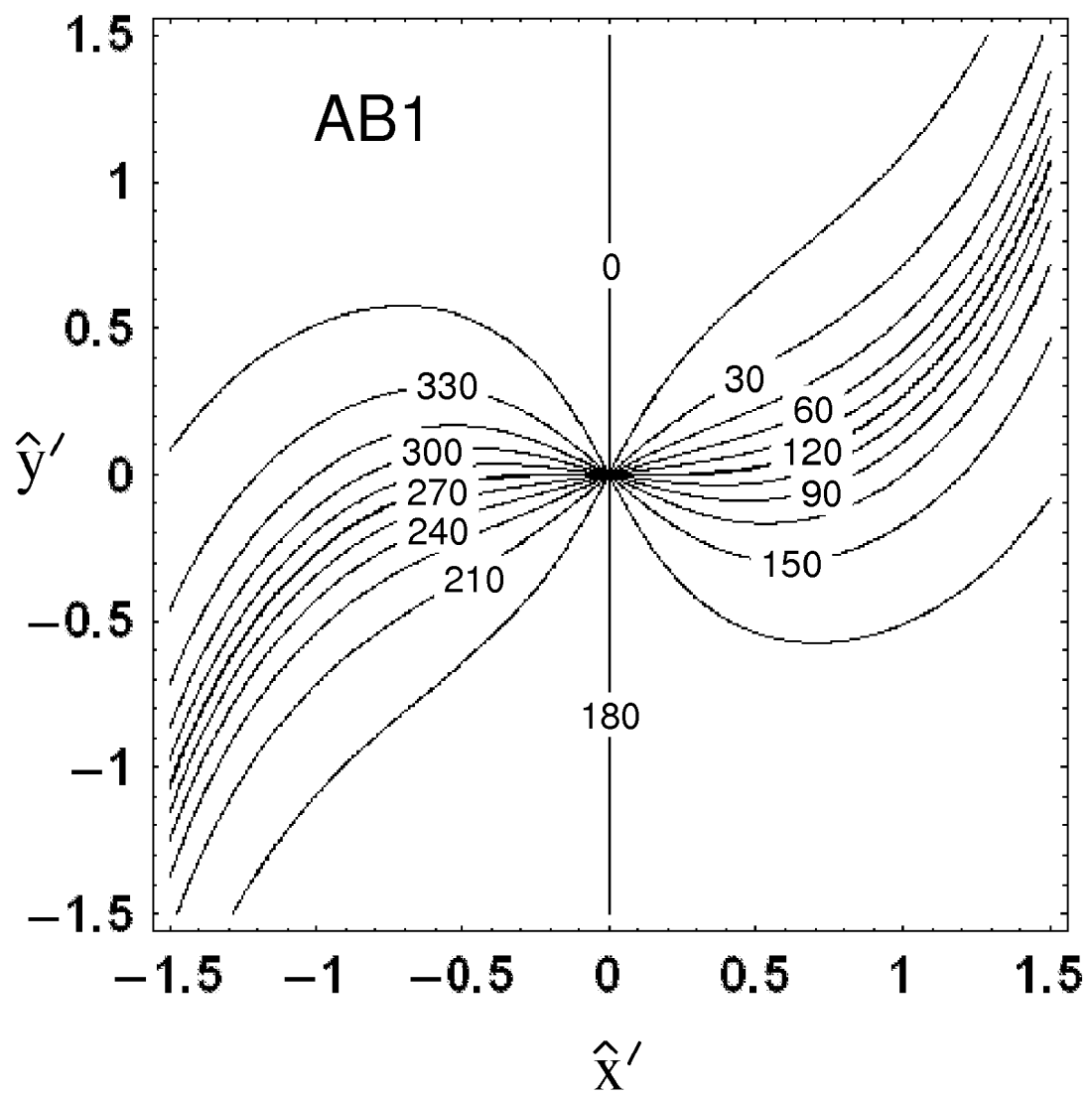
FIG. 7-FIG. 15 show detail plots of phase difference vs. x-y position in the receiver frame of reference axes x̂' and ŷ'.

FIG. 6F superimposes FIG. 6C and FIG. 6D. The resulting phase contour lines for the second state enable highly accurate direction finding for a near-field quadrature transmitter 200 within about λ/2π of near-field locator receiver 502, and less accurate direction finding for ranges greater than about λ/2π. The contour lines may provide useful information out to λ/2 or λ.

Figure 8:
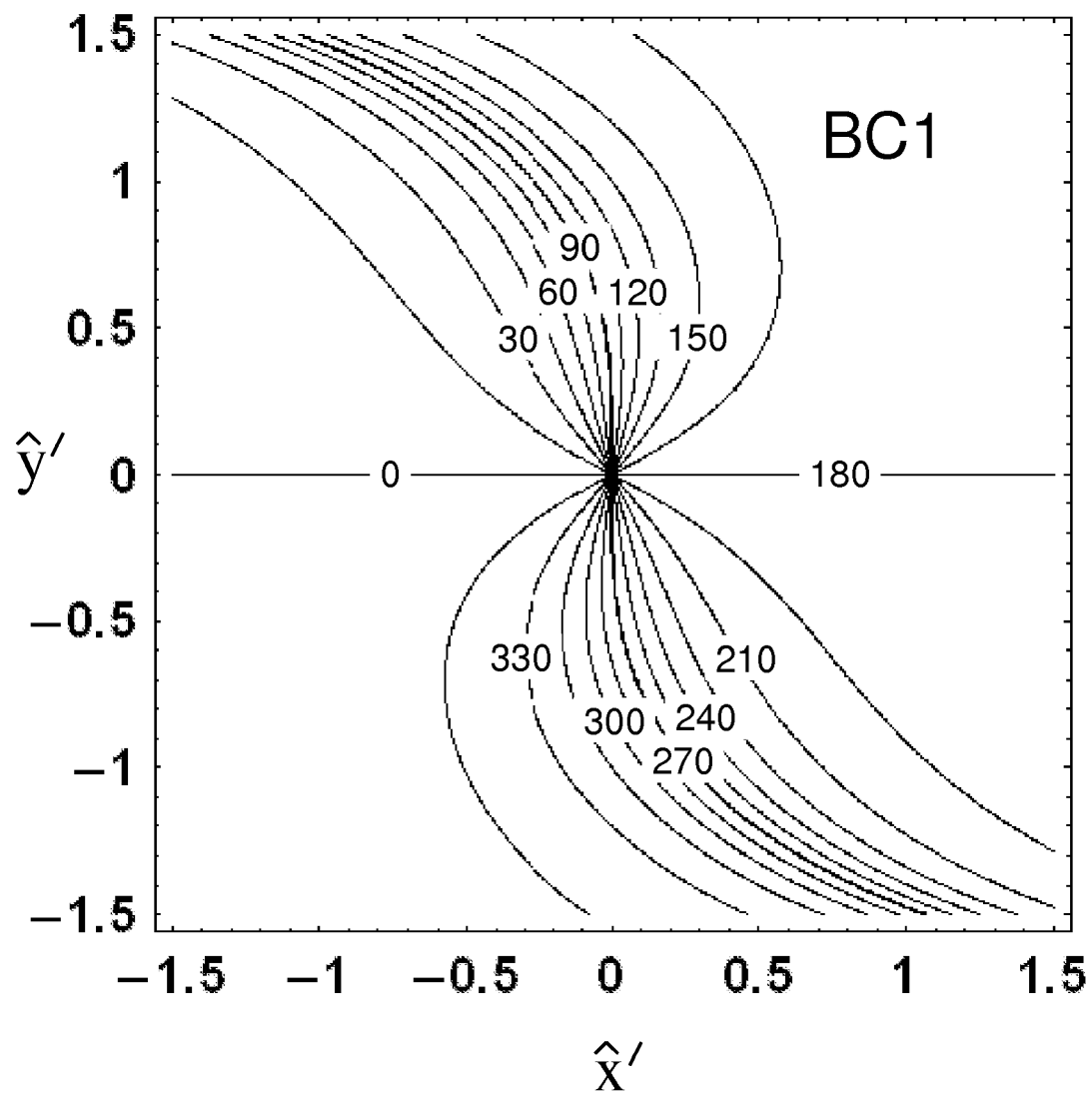
Figure 9:
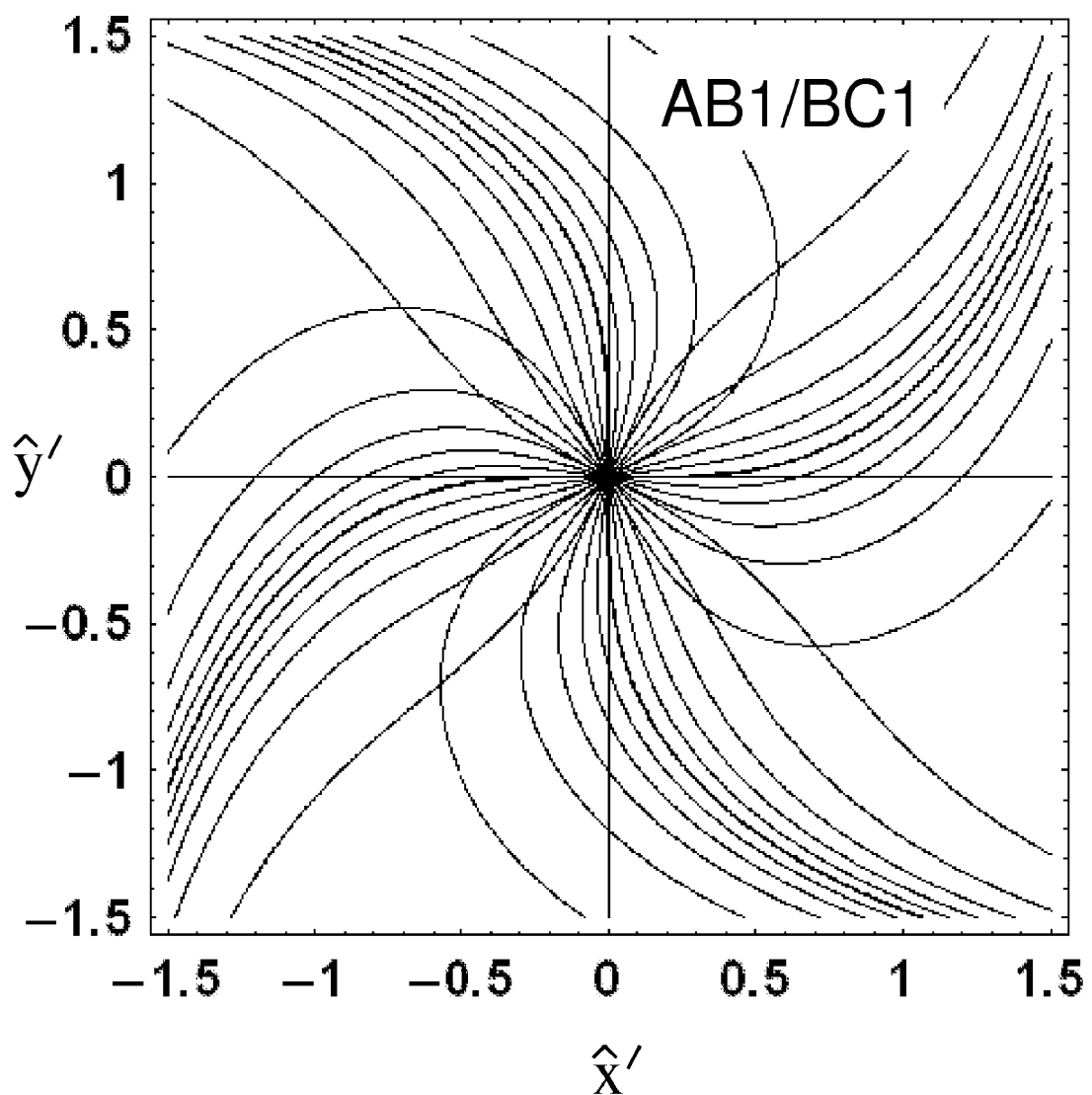
Figure 12:
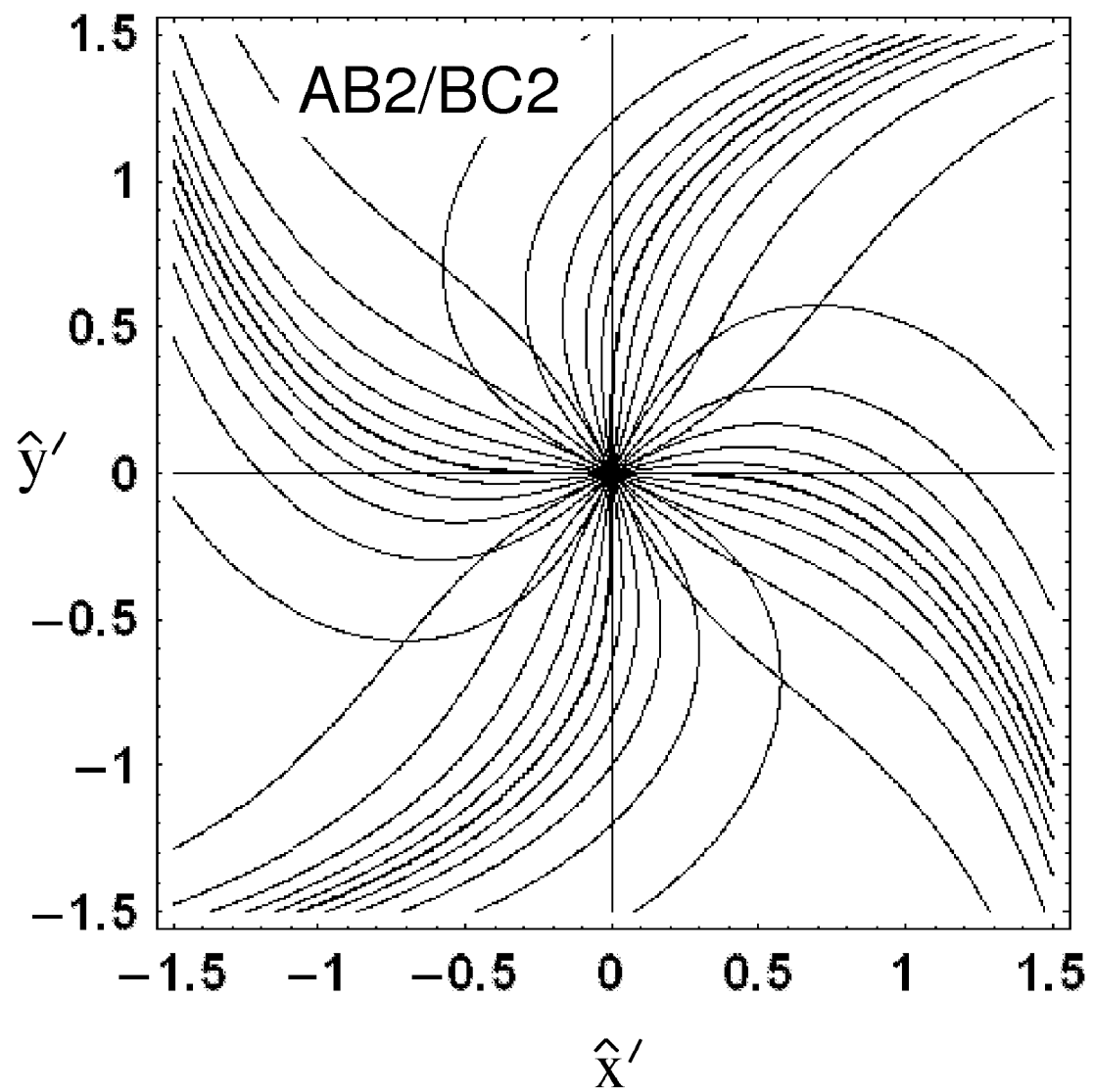
Figure 13:
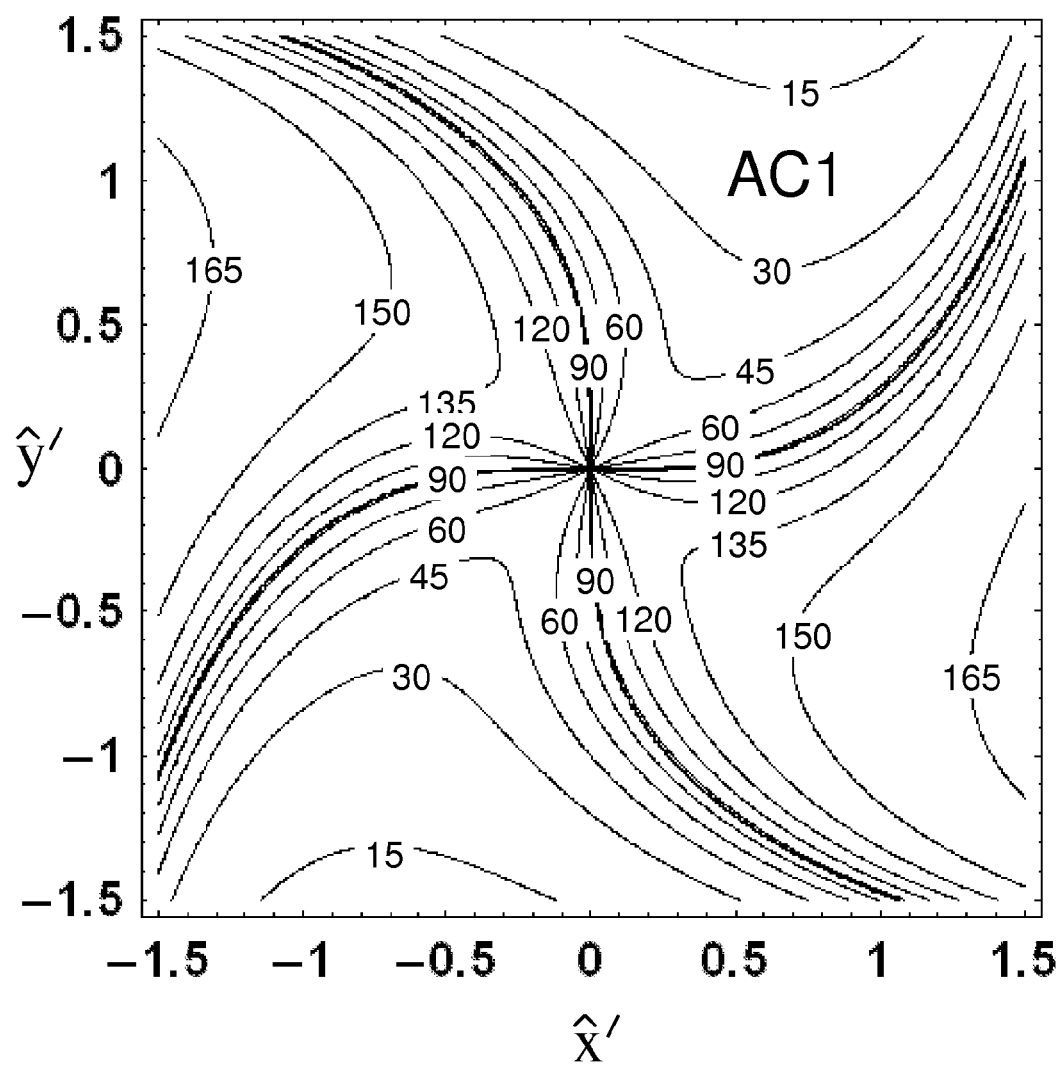
Figure 14:
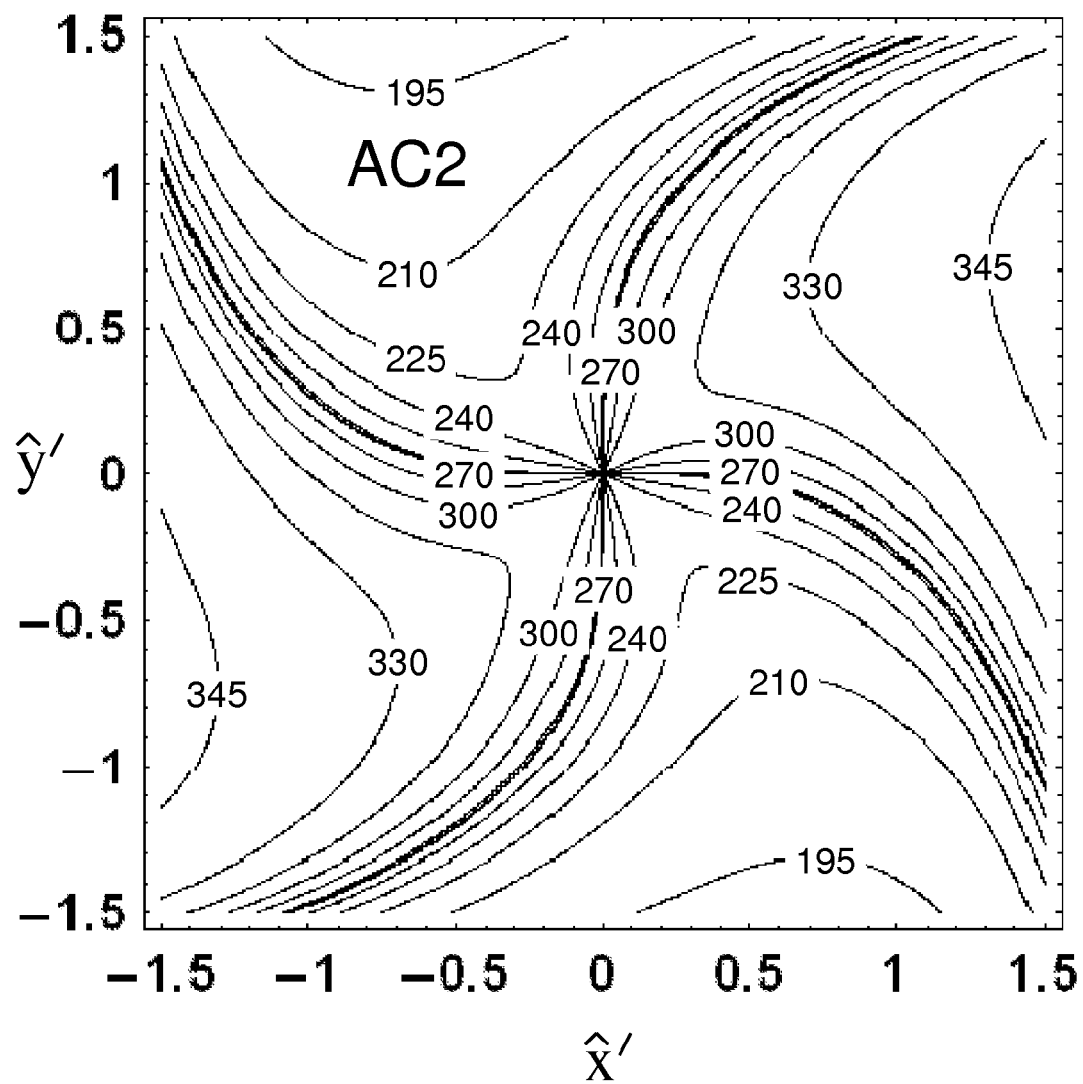

FIG. 7-FIG. 15 show detail plots of phase difference vs. x-y position in the receiver frame of reference axes $\hat{x}'$ and $\hat{y}'$ in a preferred embodiment. The $\hat{x}'$ and $\hat{y}'$ axis scales are in wave number, i.e. full scale of 1.5 radians is a distance of about one quarter wavelength of the characteristic frequency. The figures show constant phase difference locus plots for various phase difference pairs. A notation comprising two letters and a numeral indicates the phases shown. "A" and "C" denote each respective magnetic antenna. "B" denotes the electric antenna. "1" and "2" denote phase state 1 or phase state 2 respectively. Thus, the notation in FIG. 7 "AB1" denotes that the plots are for the "A" magnetic antenna to electric antenna signal phase difference for phase state 1. The phase angle differences are plotted for fifteen degree increments. Thirty degree increments are labeled. FIGS. 7-10 show magnetic to electric phase differences. FIGS. 9 and 12 show the overlay of two of the above plots as indicated. FIGS. 13 and 14 show magnetic "A" antenna to magnetic "C" antenna phase difference for phase rotation direction states 1 and 2 respectively. Phase difference values are labeled in the plots. Note that the phase rotation direction state 1 phase differences are all less than 180 degrees and all phase rotation direction state 2 phase differences are all greater than 180 degrees. Thus, the magnetic to magnetic or AC phase difference alone can be used to decode the phase rotation state. This information can be used to assign the state value to measurements being taken or may be used to demodulate data being communicated by modulating the rotation state.

Location Determination Process

Figure 16:
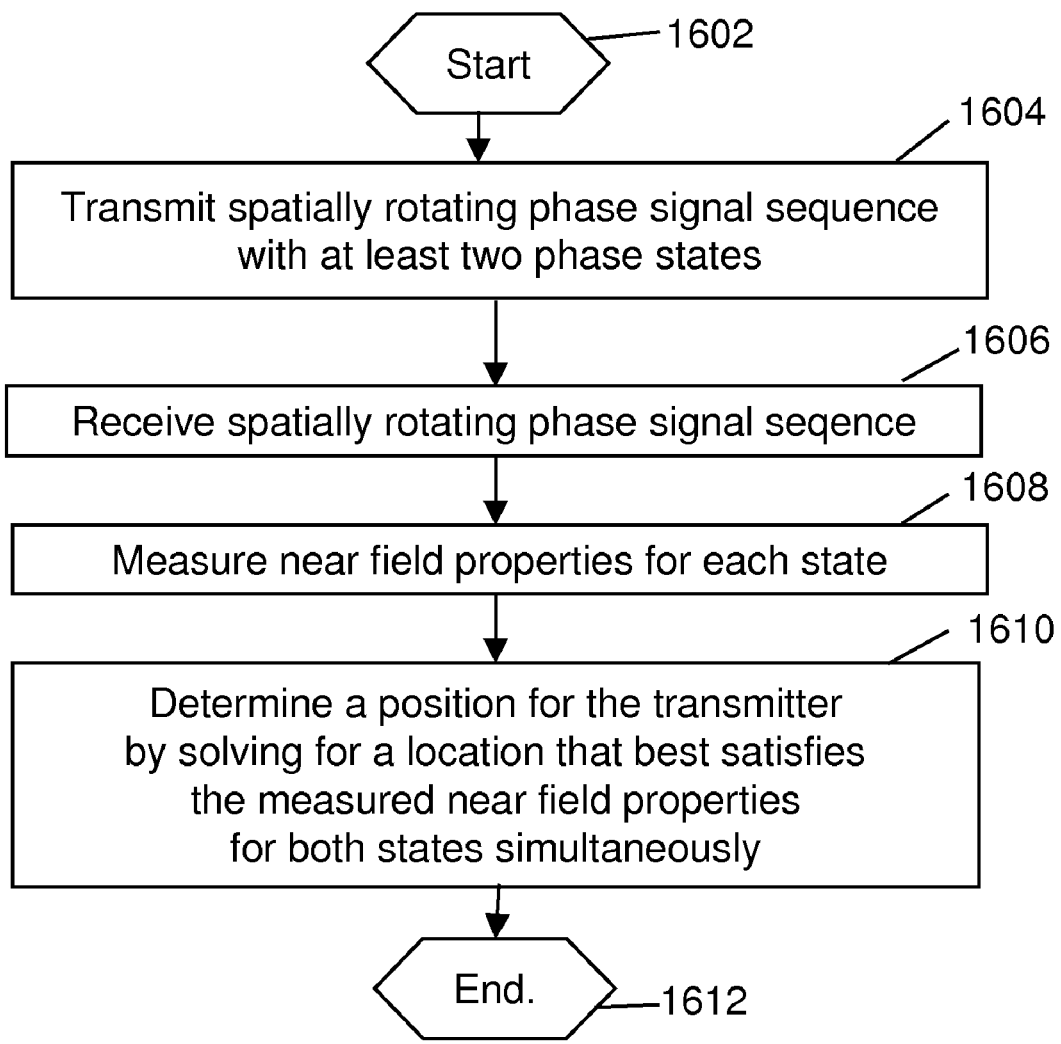
FIG. 16 illustrates an exemplary location determination process in accordance with the present invention.

FIG. 16 illustrates an exemplary location determination process in accordance with the present invention. Starting 1602 with step 1604, the transmitter transmits a signal sequence generating at least two near-field phase states for locator-receivers around the near-field transmitter. Each state is transmitted for a given interval of time and the states may be transmitted on a schedule according to a pattern generator to assist the receiver in determining which state is which upon reception.

In step 1606, the signal sequence is received and the phase difference is measured between two received components of the transmitted signal for each state. The properties may include the phases or amplitudes of the E-field and each H-field received signals or of the two H-field received signals.

In step 1608, the time interval for each state is determined according to the state determination method so that phase or amplitude measurements may be properly associated with the respective states.

State determination may be achieved by a number of exemplary methods including synchronization by an independent signaling method, observation of modulation on the near field signal due to state changes, transmission of a synchronization pattern, use of an asymmetric state change schedule to identify each state, or other methods as are known in communications arts for synchronizing signals. Also, phase comparison between magnetic signals may be used to decode the phase state.

In 1610, once the near field signal properties are measured for each transmission state, the position is determined by finding a location that best satisfies the simultaneous conditions measured. In one embodiment, the equations 1 and 2 and the plots of FIG. 6A-6F may be used to find the simultaneous solution. An exemplary position solution is described with the help of FIG. 17 and FIG. 18.

Figure 17:
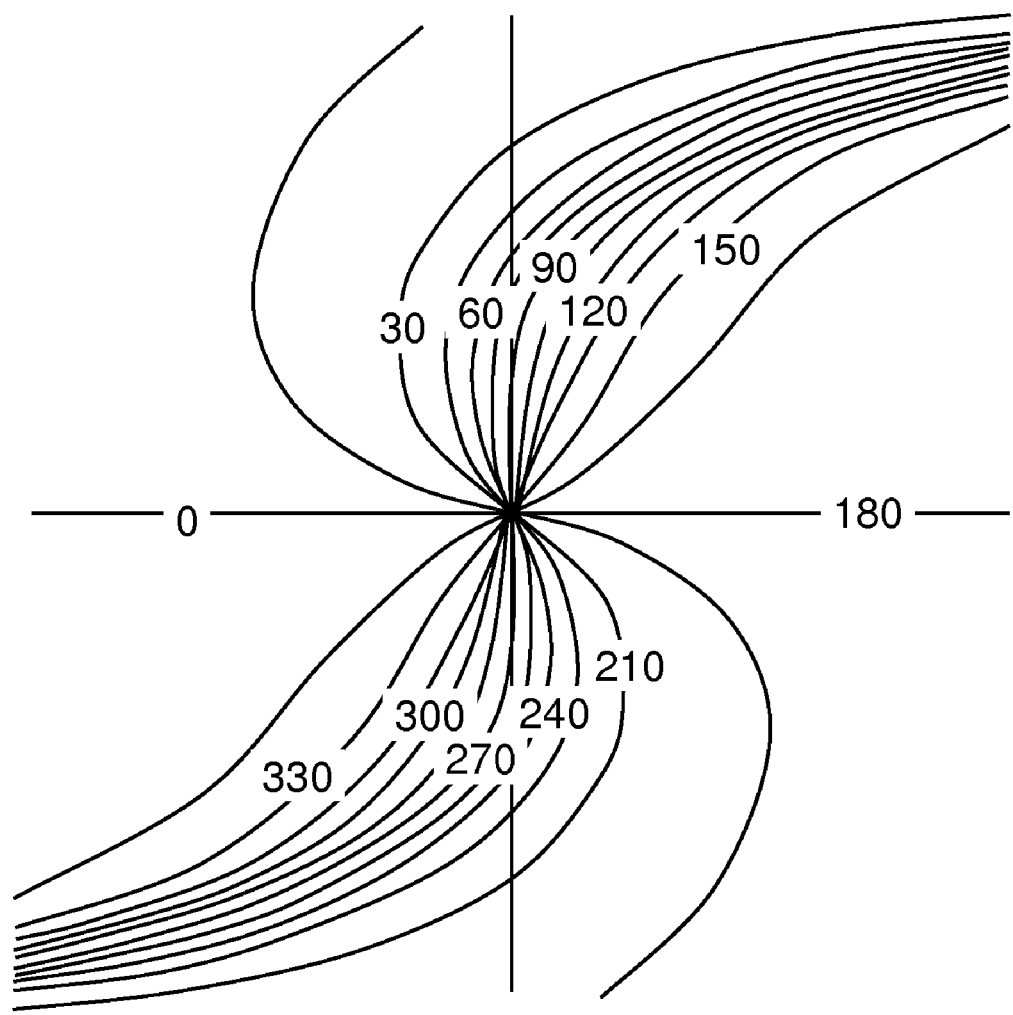
FIG. 17 shows the constant phase angle lines as shown in FIG. 6A in greater detail including phase angle values.

FIG. 17 shows the constant phase angle lines as shown in FIG. 6A in greater detail including phase angle values.

Figure 10:
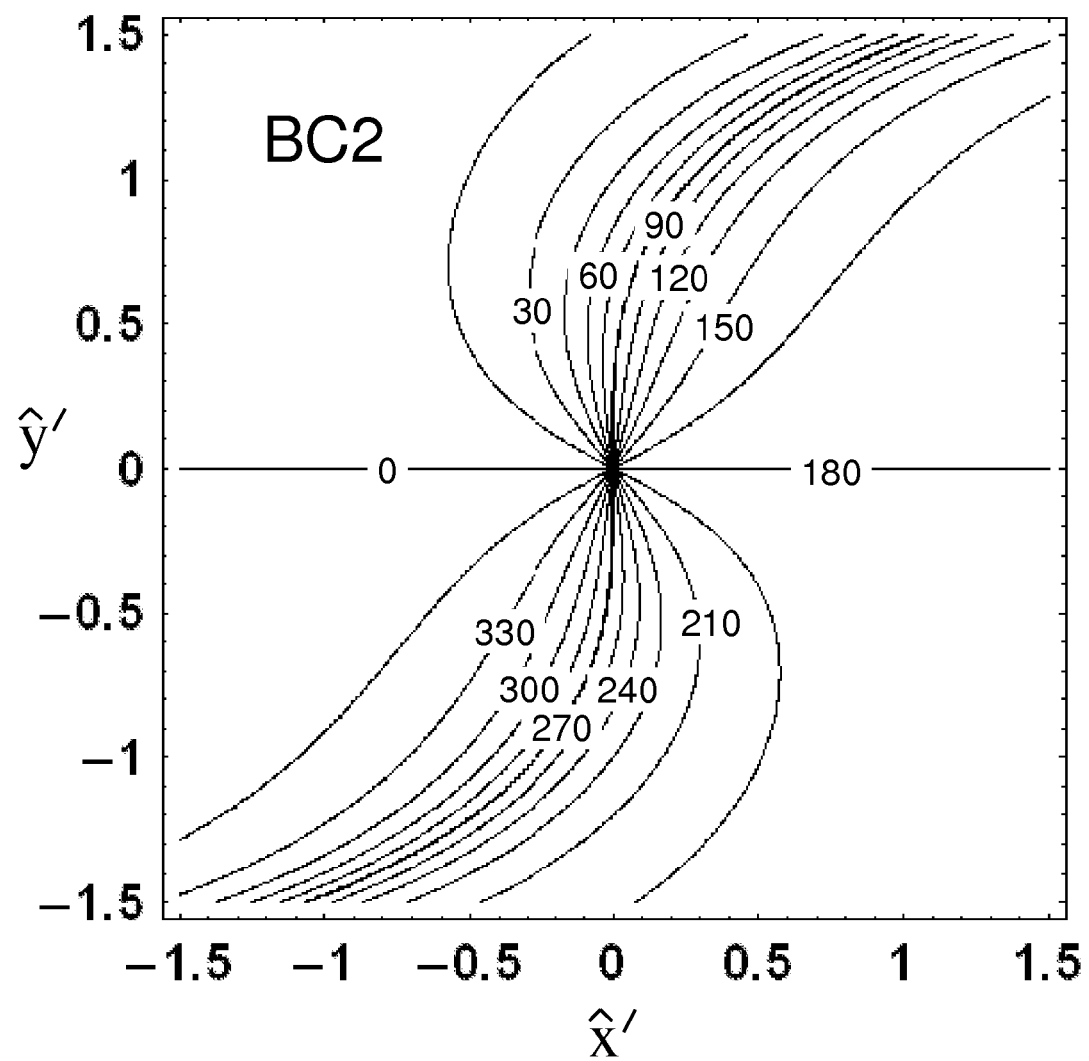
Figure 11:
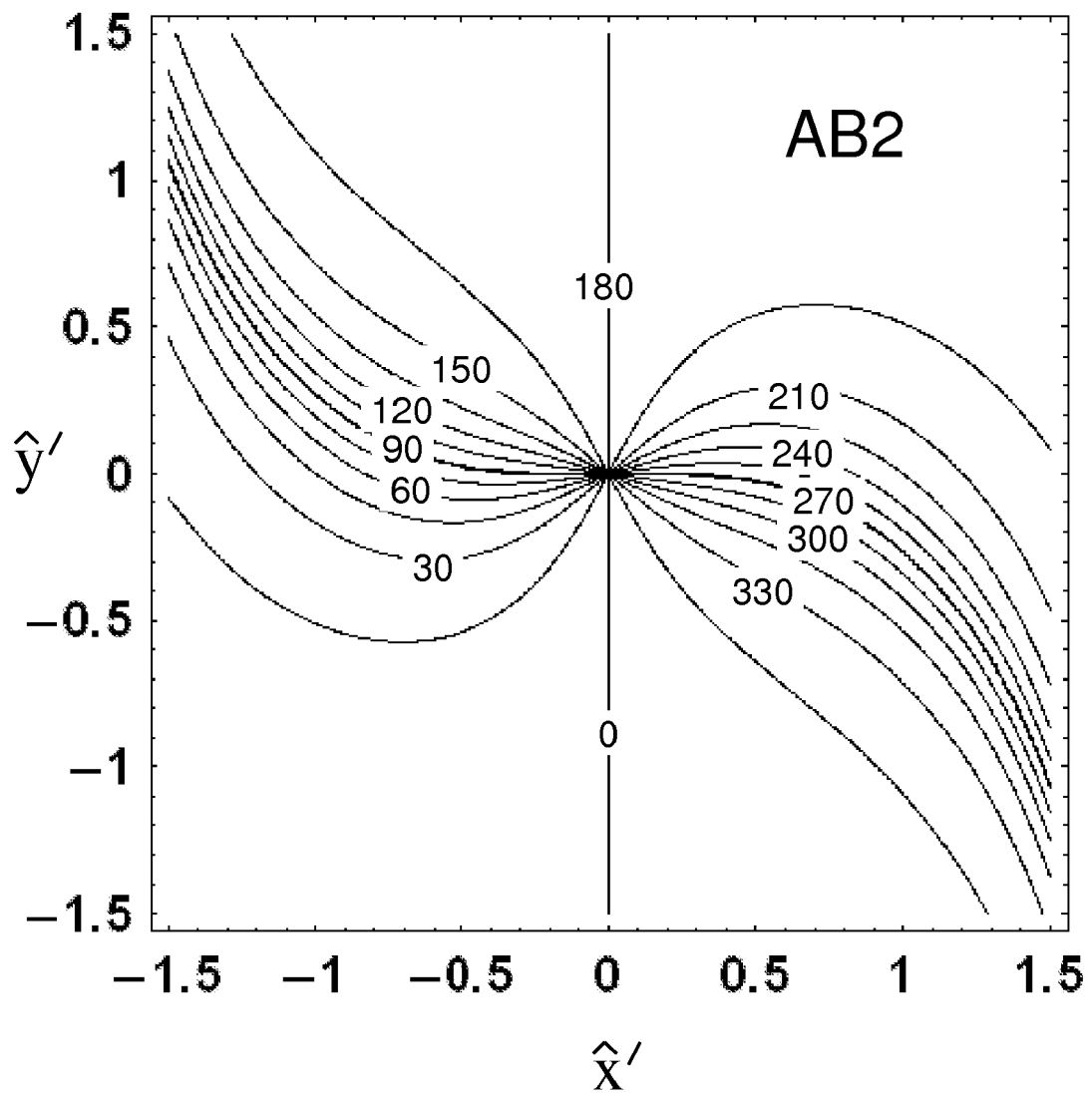
Figure 18:
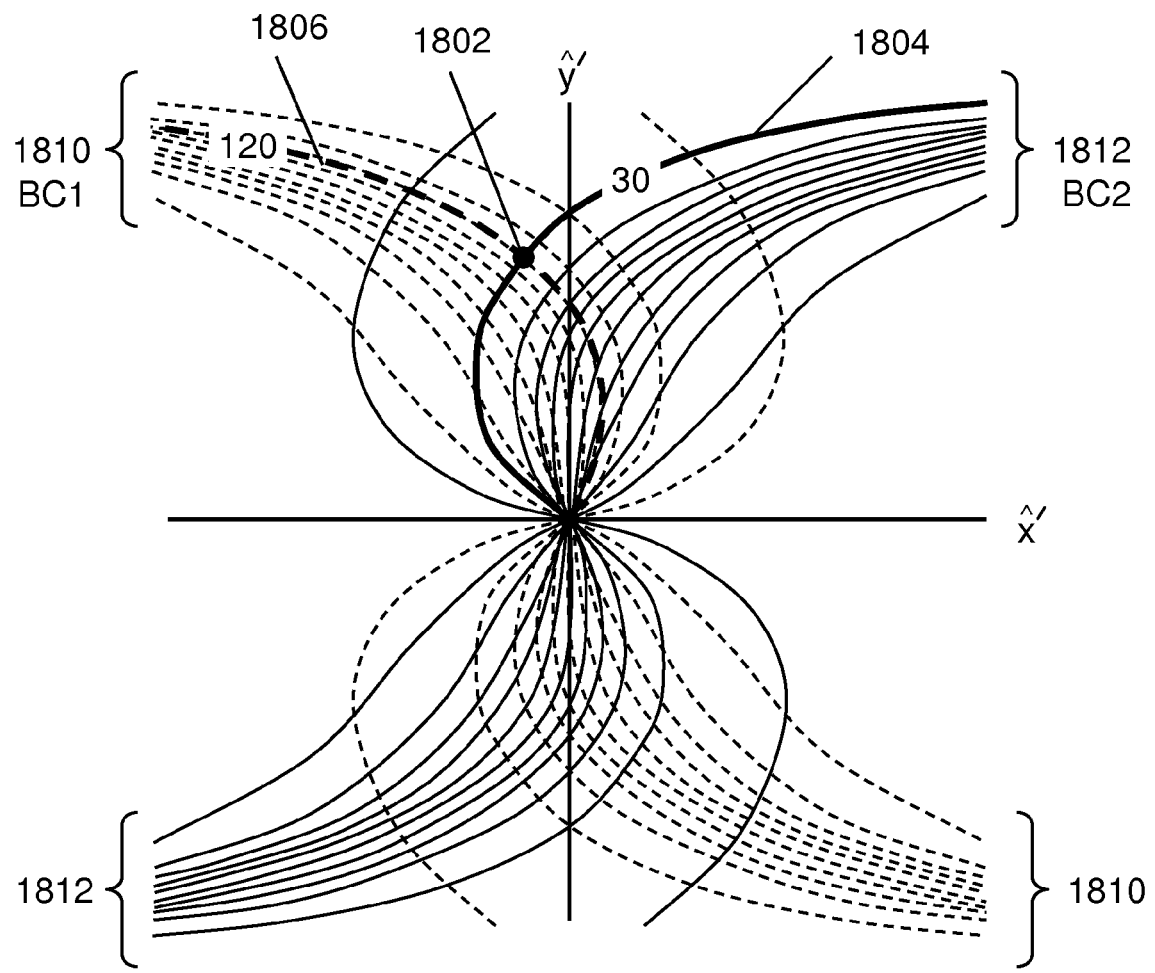
FIG. 18 shows an exemplary location solution plot using the E-field equation plots of FIG. 6A, FIG. 6C, FIG. 10, and FIG. 8.

FIG. 18 shows an exemplary location solution plot using the E-field equation plots of FIG. 6A, FIG. 6C, FIG. 10, and FIG. 8. FIG. 6C and FIG. 8 show the state 1 electric to second magnetic (BC1) phase plots. FIG. 6A and FIG. 10 show the state 2 electric to second magnetic (BC2) phase plots.

The location solution of FIG. 18 solves a simultaneous solution for an exemplary measurement of (BC1) electric to magnetic signal 2 phase delta for transmitter state 1 of 120 degrees and an exemplary measurement of (BC2) electric to magnetic signal 2 phase delta for transmitter state 2 of 30 degrees.

Referring to FIG. 18, the family of constant phase lines for FIG. 6A (state 1) and FIG. 6C (state 2) are overlaid in the diagram. The constant phase lines from FIG. 6A (state 1) are shown in dashed lines, the lines from FIG. 6C (state 2) are shown in solid lines. The 120 degree line 1806 from state 1 and the 30 degree line 1804 from state 2 are shown as heavy lines. The 120 degree line 1806 from state 1 represents a locus of all possible locations for the transmitter that would produce a 120 degree phase measurement at the receiver from a transmitter transmitting using state 1 phase rotation. The 30 degree line 1804 from state 2 represents a locus of all locations of the transmitter that would produce a 30 degree phase measurement from state 2. Thus, the location 1802 where these two lines intersect represents the simultaneous solution of the location equations for the two states.

Note that the location 1802 was found in the example of FIG. 18 by using only one receiver H-field antenna. Thus, for some applications, the receiver need only have a single H-field antenna. Note also that the plot of FIG. 18 has empty space near the x axis extensions indicating poor resolution in these regions. By using signals from the second magnetic antenna, graphs from FIG. 7 (AB1) and FIG. 11 (AB2) may be overlaid to provide good resolution along the x axis, allowing the combination to provide good resolution for the entire 360 radial degrees in the coverage area. Thus, using two magnetic antennas is normally the preferred configuration.

The exemplary solution of FIG. 18 can be generalized by observing that the four measurements discussed so far: AB1, AB2, BC1 and BC2 each give independent locus plots of possible position solutions. Thus, a host of mathematical and numerical techniques may be applied to the simultaneous solution of the set of four locus equations. Since typically two plots are sufficient for a solution, the set of four can be an over determined set, offering opportunities for selecting the best solution or weighting the data for a combined solution.

In one embodiment, the location process may select the H-field antenna to be used for determining the transmitter location by selecting the antenna with the strongest signal, or by selecting the antenna based on the location found or by using both criteria. Alternatively the location determinations from the two H-field antennas may be combined by averaging or by weighted averaging based on signal strength in each respective H-field antenna.

In a system having a network of location receivers, triangulation information may be used for increasing the accuracy of positioning by combining the measurements from several receivers to achieve a best estimate location using averaging, least squares, maximum likelihood, Kalman filtering, and/or other estimation techniques.

Magnetic to Magnetic Antenna Phase Measurements

Figure 15:
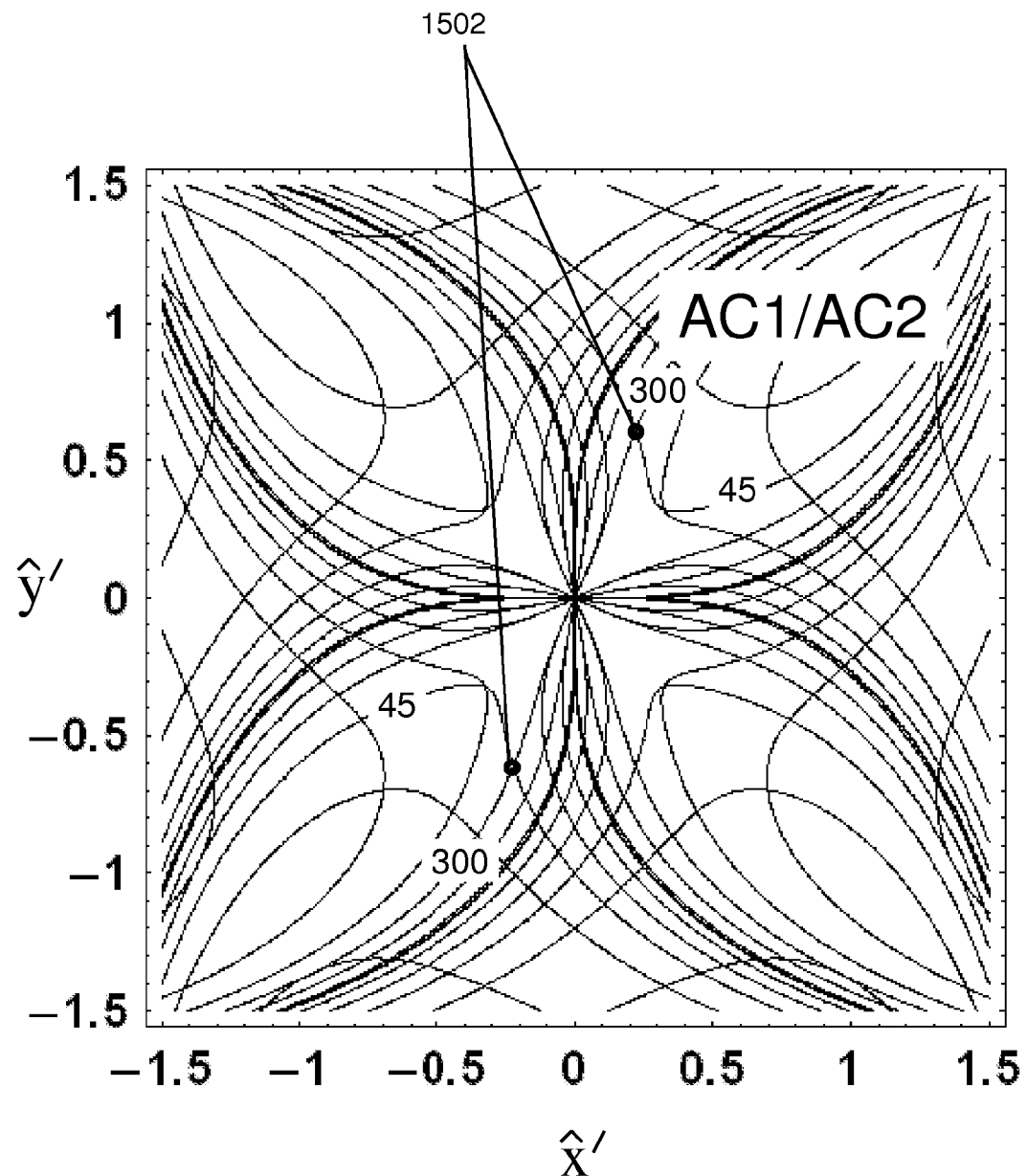

FIG. 13, FIG. 14, and FIG. 15 show the phase delta between the first magnetic antenna (A) and the second magnetic antenna (C) of the location receiver. It can be appreciated from FIGS. 13 and 14 that the phase difference AC produces two significantly independent position locus plots for the two transmitter rotation states 1 and 2. Thus, AC1 and AC2 may also be overlaid to find simultaneous position location solutions in a similar manner to FIG. 18. FIG. 13 and FIG. 14 are overlaid to produce FIG. 15. Thus, one may construct an exemplary solution for a 45 degree measurement in FIG. 13 and a 300 degree measurement in FIG. 14. The resulting overlay solution shows two locations 1502 in FIG. 15 due to symmetry. The ambiguity may be resolved by including additional information. For example, a BC1 or BC2 measurement or both would find a locus covering only one of the solutions found in FIG. 15.

Note that the phase rotation direction state 1 phase differences are all less than 180 degrees and all phase rotation direction state 2 phase differences are all greater than 180 degrees. Thus, the phase difference alone can be used to decode the phase rotation state. This information can be used to assign the state value to measurements being taken or may be used to demodulate data being communicated by modulating the rotation state.

Using Measured and Calibrated Environments

The plots of FIGS. 6A-6F and 8A-8B were derived using equations 1 and 2 and may be used for open field or relatively uncluttered general environments. In an alternative embodiment, the plots of FIGS. 6A-6F may be determined wholly or in part by actual measurement. E and H-field phase measurements may be taken at any number of points in the area where future location determinations are to be made. The E and H measurements may be interpolated or combined with theoretical calculations to generate a more finely resolved map of phase vs. position across the area. When a location is to be determined, the measured E–H phase differences from the location signal may be applied to the map database in lieu of the plots of FIG. 6A-6D to determine the transmitter location. By using pre-measured environments, local field disturbances and some equipment calibration errors may be eliminated from the location result. Further details on using measured environments can be found in application "Near field electromagnetic positioning system and method," (Ser. No. 10/958,165; filed Oct. 4, 2004, now U.S. Pat. No. 7,298,314 issued Nov. 20, 2007), which has been incorporated by reference above.

Figure 19:
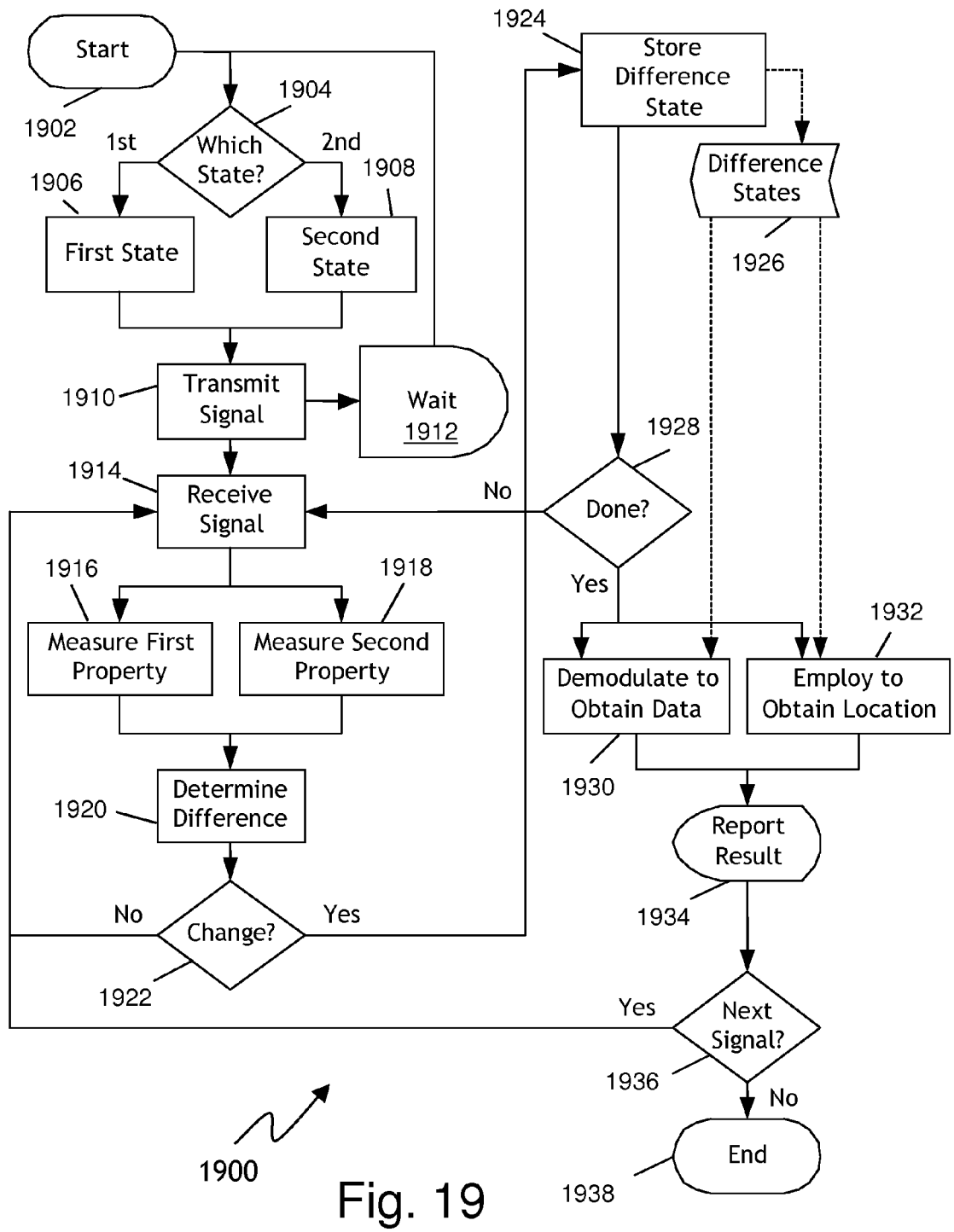
FIG. 19 is a process flow diagram describing a variable state near-field electromagnetic communication and location process 1900.

Variable State Near-Field Electromagnetic Communication and Location Process FIG. 19 is a process flow diagram describing a variable state near-field electromagnetic communication and location process 1900. The process 1900 begins at a "Start" block 1902. The process 1900 continues at a Decision block 1904. Decision block 1904 portrays a microprocessor or other agent deciding which of at least two possible states to drive a near-field quadrature transmission. Decision block 1904 may be influenced by input from the accelerometer 202 regarding orientation, or by a desired data signal to be communicated by the near-field transmission. If the outcome of Decision block 1904 is to select the first state, then the process 1900 continues at the first state block 1906. If the outcome of Decision block 1904 is to select the second state, then the process 1900 continues at the second state block 1908.

First state block 1906 corresponds to a near-field quadrature transmission in a first quadrature state: for instance with a right-handed or counterclockwise rotating pattern as in FIG. 3C. Second state block 1908 corresponds to a near-field quadrature transmission in a second quadrature state: for instance with a left-handed or clockwise rotating pattern as in FIG. 3D. The process 1900 continues with transmit signal block 1910.

Transmit signal block 1910 involves generation of a near-field quadrature transmission in either the first state or the second state, as selected in decision block 1904. Transmit signal block 1910 may describe either a continuous signal or a short duration or transient signal. The process 1900 branches with one branch continuing at a delay block 1912 and another block continuing at receive signal block 1914. Periodically, the near-field quadrature transmitter must reassess whether to transmit again, and if so, in which state to transmit. When appropriate due to a predetermined transmission plan or in response to outside stimulation such as a change in orientation or receipt of a data communication, delay block 1912 continues the process 1900 back at decision block 1904.

Simultaneously, the process also continues at receive signal block 1914. This reflects the fact that the near-field quadrature transmitter may be changing or varying states and even initiating and ending transmissions in a way completely asynchronous from the reception part of the process 1900 that begins at receive signal block 1914.

In receive signal block 1914, the near-field locator receiver receives the transmission from the near-field quadrature transmitter. The reception described in receive signal block 1914 preferentially involves the reception of multiple different signal components, for instance, electric components and magnetic components. In general, receive signal block 1914 will require multiple independent receivers and antennas to detect these different field components. The process 1900 continues, in no particular order, with the measurement of a first property in first property measurement block 1916 and with the measurement of a second property in second property measurement block 1918.

First property measurement block 1916 involves measurement of some first property of the received signal, for instance, the phase of a particular component. Second property measurement block 1918 involves measurement of some second property of the received signal, for instance, the phase of a different particular component. The process 1900 continues with difference determination block 1920.

In difference determination block 1920, the near-field locator receiver determines a difference between two properties of the received signal. In a preferred embodiment, this difference is a phase difference between an electric and a magnetic field component such as $\Delta\phi_{AB}$ or $\Delta\phi_{BC}$, or a phase difference between two magnetic field components such as $\Delta\phi_{AC}$. The value of the difference is characteristic of and corresponds to the particular state chosen in decision block 1904. Alternatively, amplitude differences may be used as further described in U.S. Pat. No. 6,963,301, which is incorporated herein by reference. The process 1900 continues with decision block 1922.

In decision block 1922, the near-field locator receiver detects whether there has been a change in the detected difference state determined in block 27 relative to previously determined difference state. One way this might be accomplished, for instance, would be to maintain a long term and a short term running average of detected differences. When a sufficiently large difference appears between the long term and the short term running averages, a change is deemed to have occurred. If there has been no change, the process 1900 continues back at the receive signal block 1914. If there has been a change, then the process 1900 continues at the store difference state block 1924.

In the store difference state block 1924, the near-field locator receiver stores the result of the difference determination in block 1920 to a difference states database 1926. The process 1900 continues with decision block 1928.

In decision block 1928, the near-field locator receiver decides whether it is completed receiving and processing signals. If so, the process 1900 continues back at the receive signal block 1914. If not, the process 1900 continues with, in no particular order, demodulation block 1930 and location determination block 1932.

In demodulation block 1930, the near-field locator receiver reviews the results stored in the difference states database 1926 to demodulate intelligence impressed on the near-field transmission by the near-field quadrature transmitter. In simplest form, demodulation block 1930 involves distinguishing between two or more distinct difference states and assigning them bits.

In location determination block 1932, the near-field locator receiver employs the results stored in the difference states database 1926 to determine the location of the near-field quadrature transmitter. In simplest form, location determination block 1932 involves use of the specific values of two or more distinct difference states in a near-field electromagnetic ranging algorithm. In a preferred embodiment, the near-field locator receiver relays results stored in the difference states database 1936 to the central processor for correlation with results from other near-field locator receivers in order to determine a location result for the near-field quadrature transmitter. The process 1900 continues with optional report result block 1934 in which either communication or location data may be display, relayed, or otherwise reported. The process then continues at decision block 1936.

At decision block 1936, the near-field locator receiver decides whether to continue the process 1900 by receiving another signal. If so, the process 1900 continues back at the receive signal block 1910. If not, the process 1900 terminates at end block 1938.

Figure 20:
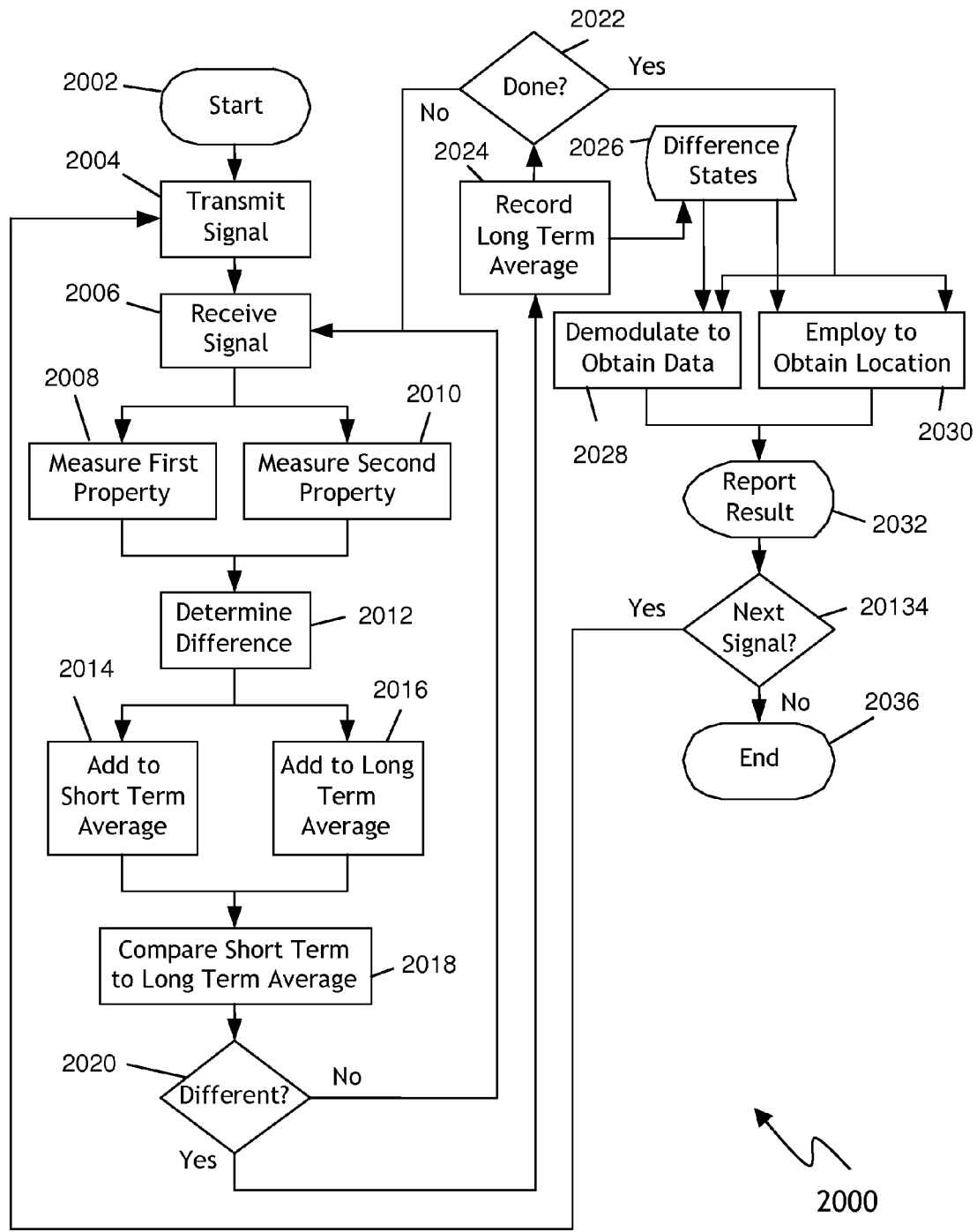
FIG. 20 is a process flow diagram describing a variable state near-field electromagnetic communication and location process 2000.

FIG. 20 is a process flow diagram describing a variable state near-field electromagnetic communication and location process 2000. The process 2000 begins at a "Start" block 2002. The process 2000 continues at transmit block 2004 where a signal is transmitted in a given state according to a localizing pattern and/or a date modulation input.

Simultaneously, the process also continues at receive signal block 2006. This reflects the fact that the near-field quadrature transmitter may be changing or varying states and even initiating and ending transmissions in a way completely asynchronous from the reception part of the process 2000 that begins at receive signal block 2006.

In receive signal block 2006, the near-field locator receiver receives the transmission from the near-field quadrature transmitter. The reception described in receive signal block 2006 preferentially involves the reception of multiple different signal components, for instance, electric components and magnetic components or orthogonal magnetic components. In general, receive signal block 2006 will require multiple independent receivers and antennas to detect these different field components. The process 2000 continues, in no particular order, with the measurement of a first property in first property measurement block 2008 and with the measurement of a second property in second property measurement block 2010.

First property measurement block 2008 involves measurement of some first property of the received signal, for instance, the phase of a particular component. Second property measurement block 2010 involves measurement of some second property of the received signal, for instance, the phase of a different particular component. The process 2000 continues with difference determination block 2012.

In difference determination block 2012, the near-field locator receiver determines a difference between two properties of the received signal. In a preferred embodiment, this difference is a phase difference between an electric and a magnetic field component such as $\Delta\phi_{AB}$ or $\Delta\phi_{BC}$, or a phase difference between two magnetic field components such as $\Delta\phi_{AC}$. The value of the difference is characteristic of and corresponds to a particular transmitter phase state. Alternatively, amplitude differences may be used as further described in U.S. Pat. No. 6,963,301, which is incorporated herein by reference. The difference is then fed to a short term average block 2014 and a long term average block 2016. The long term average and short term average are compared at block 2018. When a sufficiently large difference appears between the long term and the short term running averages, a change is deemed to have occurred at block 2020. If there has been no change, the process 2000 continues back at the receive signal block 2006. If there has been a change, then the process 2000 continues at the record long term average 2024 and store difference state block 2026.

In the store difference state block 2026, the near-field locator receiver stores the result of the difference determination in block 2020 to a difference states database. In decision block 2022, the near-field locator receiver decides whether it is completed receiving and processing signals. If so, the process 2000 continues back at the receive signal block 2014. If not, the process 2000 continues with, in no particular order, demodulation block 2028 and location determination block 2030.

In demodulation block 2030, the near-field locator receiver reviews the results stored in the difference states database to demodulate intelligence impressed on the near-field transmission by the near-field transmitter. In simplest form, demodulation block 2028 involves distinguishing between two or more distinct difference states and assigning them bits.

In location determination block 2030, the near-field locator receiver employs the results stored in the difference states database to determine the location of the near-field transmitter. In simplest form, location determination block 2030 involves use of the specific values of two or more distinct difference states in a near-field electromagnetic ranging algorithm. In a preferred embodiment, the near-field locator receiver relays results stored in the difference states database to the central processor for correlation with results from other near-field locator receivers in order to determine a location result for the near-field transmitter. The process 2000 continues with optional report result block 2032 in which either communication or location data may be display, relayed, or otherwise reported. The process then continues at decision block 2034. At decision block 2034, the near-field locator receiver decides whether to continue the process 2000 by receiving another signal. If so, the process 2000 continues back at the transmit signal block 2004. If not, the process 2000 terminates at end block 2036.

Figure 21:
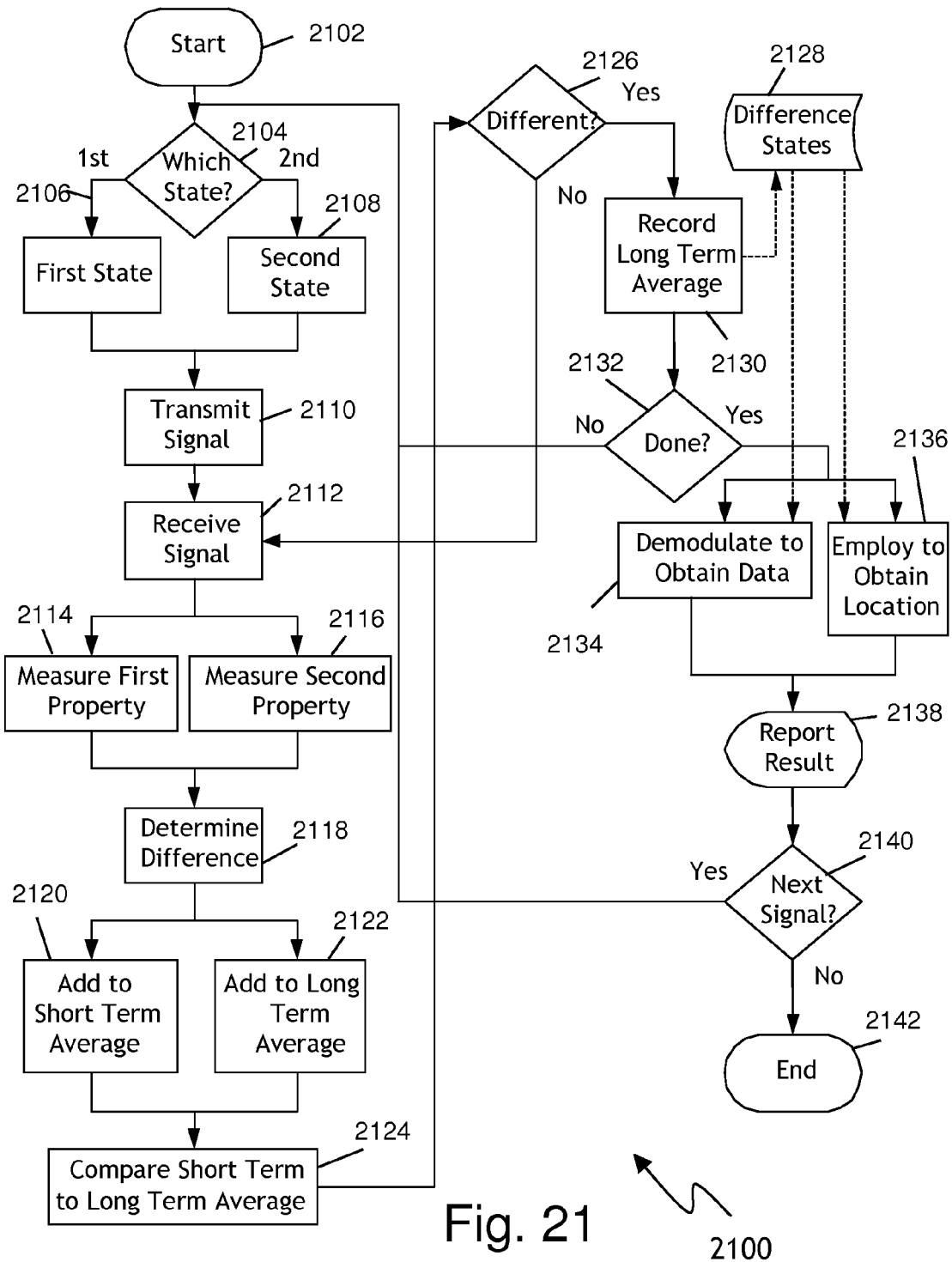
FIG. 21 is a process flow diagram describing a variable state near-field electromagnetic communication and location process 2100.

FIG. 21 is a process flow diagram describing a variable state near-field electromagnetic communication and location process 2100. The process 2100 begins at a "Start" block 2102. The process 2100 continues at a Decision block 2104. Decision block 2104 portrays a microprocessor or other agent deciding which of two possible states to drive a near-field quadrature transmission. Decision block 2104 may be influenced by input from the accelerometer 202 regarding orientation, or by a desired data signal to be communicated by the near-field quadrature transmission. If the outcome of Decision block 2104 is to select the first state, then the process 2100 continues at the first state block 2106. If the outcome of Decision block 2104 is to select the second state, then the process 2100 continues at the second state block 2108.

First state block 2106 corresponds to a near-field quadrature transmission in a first quadrature state: for instance with a right-handed or counterclockwise rotating pattern as in FIG. 3C. Second state block 2108 corresponds to a near-field quadrature transmission in a second quadrature state: for instance with a left-handed or clockwise rotating pattern as in FIG. 3D. The process 2100 continues with transmit signal block 2110.

Transmit signal block 2110 involves generation of a near-field quadrature transmission in either the first state or the second state, as selected in decision block 2104. Transmit signal block 2110 may describe either a continuous signal or a short duration or transient signal.

Simultaneously, the process also continues at receive signal block 2112. This reflects the fact that the near-field quadrature transmitter may be changing or varying states and even initiating and ending transmissions in a way completely asynchronous from the reception part of the process 2100 that begins at receive signal block 2112.

In receive signal block 2112, the near-field locator receiver receives the transmission from the near-field quadrature transmitter. The reception described in receive signal block 2112 preferentially involves the reception of multiple different signal components, for instance, electric components and magnetic components. In general, receive signal block 2112 will require multiple independent receivers and antennas to detect these different field components. The process 2100 continues, in no particular order, with the measurement of a first property in first property measurement block 2114 and with the measurement of a second property in second property measurement block 2116.

First property measurement block 2114 involves measurement of some first property of the received signal, for instance, the phase of a particular component. Second property measurement block 2116 involves measurement of some second property of the received signal, for instance, the phase of a different particular component. The process 2100 continues with difference determination block 2118.

In difference determination block 2118, the near-field locator receiver determines a difference between two properties of the received signal. In a preferred embodiment, this difference is a phase difference between an electric and a magnetic field component such as $\Delta\phi_{AB}$ or $\Delta\phi_{BC}$, or a phase difference between two magnetic field components such as $\Delta\phi_{AC}$. The value of the difference is characteristic of and corresponds to the particular state chosen in decision block 2104. Alternatively, amplitude differences may be used as further described in U.S. Pat. No. 6,963,301, which is incorporated herein by reference. The difference is then fed to a short term average block 2120 and a long term average block 2122. The long term average and short term average are compared at block 2124. When a sufficiently large difference appears between the long term and the short term running averages, a change is deemed to have occurred at block 2126. If there has been no change, the process 2100 continues back at the receive signal block 2112. If there has been a change, then the process 2100 continues at the record long term average block 2130 and store difference state block 2128.

In the store difference state block 2128, the near-field locator receiver stores the result of the difference determination in block 2118 to a difference states database. The process 2100 continues with decision block 2132.

In decision block 2132, the near-field locator receiver decides whether it is completed receiving and processing signals. If not, the process 2100 continues back at the beginning 2104. If so, the process 2100 continues with, in no particular order, demodulation block 2134 and location determination block 2136.

In demodulation block 2134, the near-field locator receiver reviews the results stored in the difference states database to demodulate intelligence impressed on the near-field transmission by the near-field quadrature transmitter. In simplest form, demodulation block 2134 involves distinguishing between two or more distinct difference states and assigning them bits.

In location determination block 2136, the near-field locator receiver employs the results stored in the difference states database to determine the location of the near-field quadrature transmitter. In simplest form, location determination block 2136 involves use of the specific values of two or more distinct difference states in a near-field electromagnetic ranging algorithm. In a preferred embodiment, the near-field locator receiver relays results stored in the difference states database to the central processor for correlation with results from other near-field locator receivers in order to determine a location result for the near-field quadrature transmitter. The process 2100 continues with optional report result block 2138 in which either communication or location data may be display, relayed, or otherwise reported. The process then continues at decision block 2140.

At decision block 2140, the near-field locator receiver decides whether to continue the process 2100 by transmitting and receiving another signal. If so, the process 2100 continues back at the beginning block 2104. If not, the process 2100 terminates at end block 2142.

Specific applications have been presented solely for purposes of illustration to aid the reader in understanding a few of the great many contexts in which the present invention will prove useful. It should also be understood that, while the detailed drawings and specific examples given describe preferred embodiments of the invention, they are for purposes of illustration only, that the system and method of the present invention are not limited to the precise details and conditions disclosed and that various changes may be made therein without departing from the spirit of the invention.

We claim:

1. A multiple phase state near-field electromagnetic system for location or communication comprising:
a transmitter configured for transmitting a signal in a first phase state and in a second phase state; and
a first near field receiver; said first near field receiver configured for receiving said signal within a near field range from said transmitter;
said first near field receiver configured for receiving a first near field property of said signal in said first phase state and for receiving said first near field property of said signal in said second phase state;
said first near field receiver configured for receiving a second near field property of said signal in said first phase state and for receiving said second near field property of said signal in said second phase state;
said first near field receiver configured for generating a first phase state comparison by comparing said first near field property with said second near field property in response to said signal in said first phase state; said first phase state comparison having a first known relationship between said first phase state comparison and loci of associated transmitter positions;
said first near field receiver configured for generating a second phase state comparison by comparing said first near field property and said second near field property in response to said signal in said second phase state; said second phase state comparison having a second known relationship between said second phase state comparison and loci of associated transmitter positions;
said first near field receiver configured for determining a two coordinate position for a location of said transmitter relative to a location of said first near field receiver based on said first phase state comparison and said second phase state comparison, or said first near field receiver configured for determining information from said transmitter based on said first phase state comparison and said second phase state comparison.

2. The multiple phase state near-field electromagnetic system as recited in claim 1, wherein said first near field property is an E-field property and said second near field property is an H-field property.

3. The multiple phase state near-field electromagnetic system as recited in claim 1, wherein said first near field receiver includes a first H-field antenna and a second H-field antenna, said first H-field antenna having an axis oriented non-parallel to a corresponding axis of said second H-field antenna; wherein said first near field property is an H-field property measured by said first H-field antenna and said second near field property is an H-field property as measured by said second H-field antenna.

4. The multiple phase state near-field electromagnetic system as recited in claim 1, wherein said first near field receiver includes an E-field antenna, a first H-field antenna, and a second H-field antenna, said first H-field antenna having an axis oriented non-parallel to a corresponding axis of said second H-field antenna; wherein said first near field property is an E-field property measured by said E-field antenna and said second near field property is an H-field property as measured by at least one of said first H-field antenna or said second H-field antenna.

5. The multiple phase state near-field electromagnetic system as recited in claim 1, wherein said near field signal is transmitted using a first H-field antenna and a second H-field antenna, said first H-field antenna having an axis oriented non-parallel to a corresponding axis of said second H-field antenna.

6. The multiple phase state near-field electromagnetic system as recited in claim 1, wherein said near field signal is transmitted using a first E-field antenna and a second E-field antenna, said first E-field antenna having an axis oriented non-parallel to a corresponding axis of said second E-field antenna.

7. The multiple phase state near-field electromagnetic system as recited in claim 1, wherein said near field signal is transmitted using a E-field antenna and an H-field antenna, said E-field antenna having an axis oriented non-parallel to a corresponding axis of said H-field antenna.

8. The multiple phase state near-field electromagnetic system as recited in claim 1, wherein said near field signal is transmitted using an E-field antenna, a first H-field antenna, and a second H-field antenna, said first E-field antenna, said first H-field antenna, and said second H-field antenna having corresponding axes oriented non-parallel to one another.

9. The multiple phase state near-field electromagnetic system as recited in claim 1, wherein said near field signal is transmitted using a first H-field antenna, and a second H-field antenna, and a third H-field antenna, said first H-field antenna, said second H-field antenna, and said third H-field antenna having corresponding axes oriented non-parallel to one another.

10. The multiple phase state near-field electromagnetic system as recited in claim 1, wherein said first near field receiver computes said location of said transmitter by determining a relative location that is a simultaneous solution satisfying said first phase state comparison and said second phase state comparison.

11. The multiple phase state near-field electromagnetic system as recited in claim 1, wherein said first near field receiver determines said information transmitted by said near field transmitter by comparing said first phase state comparison and said second phase state comparison.

12. The multiple phase state near-field electromagnetic system in accordance with claim 1, wherein said first near field receiver computes said location of said transmitter by determining a relative location that is a simultaneous solution satisfying said first phase state comparison and said second phase state comparison, and simultaneously, said first near field receiver determines said information transmitted by said transmitter by comparing said first phase state comparison and said second phase state comparison.

13. The multiple phase state near-field electromagnetic system in accordance with claim 1, wherein said near field transmitter further includes a phase state controller coupled to an information source, said phase state controller configured for controlling said first phase state and said second phase state responsive to information from said information source, and said first near field receiver comprising a demodulator to recover said information based on said first phase state comparison and said second phase state comparison.

14. A method for determining a location or communicating information, said method comprising:
transmitting a signal using a transmitter at a transmitter location, and
receiving said signal using a near field receiver at a receiver location, said transmitter location within a near field range from said receiver location;
said transmitter capable of transmitting said signal in a first phase state and in a second phase state;
said first near field receiver receiving a first near field property of said signal in said first phase state and receiving said first near field property of said signal in said second phase state;
said first near field receiver receiving a second near field property of said signal in said first phase state and receiving said second near field property of said signal in said second phase state;
said first near field receiver generating a first phase state comparison by comparing said first near field property with said second near field property in response to said signal in said first phase state; said first phase state comparison having a first known relationship between said first phase state comparison and loci of associated transmitter positions;
said first near field receiver generating a second phase state comparison by comparing said first near field property and said second near field property in response to said signal in said second phase state; said second phase state comparison having a second known relationship between said second phase state comparison and loci of associated transmitter positions;
said first near field receiver determining a two coordinate position for a location of said transmitter relative to a location of said first near field receiver based on said first phase state comparison and said second phase state comparison, or said first near field receiver determining information from said transmitter based on said first phase state comparison and said second phase state comparison.

15. The method for determining a location or communicating information as recited in claim 14,
wherein the step of transmitting said near field signal in said first phase state comprises the steps of:
driving a first antenna element with a first drive signal having a first phase and
driving a second antenna element with a second drive signal having a second phase; and
wherein the step of transmitting said near field signal in said second phase state comprises the steps of:
driving said first antenna element with said first drive signal having said first phase and by driving said second antenna element by a drive signal having a third phase, said third phase differing from said second phase.

16. The method for determining a location or communicating information as recited in claim 14, wherein said first near field property is an E-field property and said second near field property is an H-field property.

17. The method for determining a location or communicating information as recited in claim 14, wherein said first near field receiver includes a first H-field antenna and a second H-field antenna, said first H-field antenna having an axis oriented non-parallel to a corresponding axis of said second H-field antenna; wherein said first near field property is an H-field property measured by said first H-field antenna and said second near field property is an H-field property as measured by said second H-field antenna.

18. The method for determining a location or communicating information as recited in claim 14, wherein said first near field receiver includes an E field antenna, a first H-field antenna, and a second H-field antenna, said first H-field antenna having an axis oriented non-parallel to a corresponding axis of said second H-field antenna; wherein said first near field property is an E-field property measured by said E field antenna, and said second near field property is an H-field property measured by at least one of said first H-field antenna or said second H-field antenna.

19. A multiple phase state near-field electromagnetic receiver for location determination or communication,
said receiver configured for receiving a near field signal at a receiver location, said near field signal being a phase transmitted signal transmitted from a transmitter at a transmitter location, said receiver location within a near field distance from said transmitter location; said near field signal capable of a first phase state and a second phase state, said first phase state differing from said second phase state;
said near field receiver comprising:
a first near field antenna for receiving a first near field property of said near field signal and a second near field antenna for receiving a second property of said near field signal; and
a phase comparator for comparing a phase of said first near field signal with a phase of said second near field signal;

said near field receiver configured for generating a first phase state comparison by comparing said first near field property with said second near field property in response to said signal in said first phase state; said first phase state comparison having a first known relationship between said first phase state comparison and loci of associated transmitter positions;
said near field receiver configured for generating a second phase state comparison by comparing said first near field property and said second near field property in response to said signal in said second phase state; said second phase state comparison having a second known relationship between said second phase state comparison and loci of associated transmitter positions;
said near field receiver configured for determining a two coordinate position for a location of said transmitter relative to a location of said near field receiver based on said first phase state comparison and said second phase state comparison, or said near field receiver configured for determining information from said transmitter based on said first phase state comparison and said second phase state comparison.

20. A system for determining a two coordinate location for a transmitter location relative to a receiver location, said system comprising:
a transmitter configured for transmitting a signal from said transmitter location, said signal capable of a first phase state and a second phase state; and
a receiver receiving said signal at said receiver location, said receiver location within a near field distance from said transmitter location,
said receiver determining a first property of said signal and determining a second property of said signal;
said receiver generating a first phase state comparison by comparing said first signal property to said second signal property during said first transmitted phase state;
said receiver generating a second phase state comparison by comparing said first signal property to said second signal property during said second transmitted phase state;
said receiver employing said first phase state comparison and said second phase state comparison to determine said two coordinate location.

* * * * *